US012591674B2

(12) United States Patent
Darling et al.

(10) Patent No.: US 12,591,674 B2
(45) Date of Patent: Mar. 31, 2026

(54) RANSOMWARE DETECTION AND MITIGATION

(71) Applicant: iManage LLC, Chicago, IL (US)

(72) Inventors: Randy Darling, Chicago, IL (US); David Cook, Chicago, IL (US); Mohit Mutreja, Chicago, IL (US); Demetri Bairaktaris, Chicago, IL (US)

(73) Assignee: iManage LLC, Chicago, IL (US)

( * ) Notice: Subject to any disclaimer, the term of this patent is extended or adjusted under 35 U.S.C. 154(b) by 63 days.

(21) Appl. No.: 18/704,908

(22) PCT Filed: Oct. 19, 2022

(86) PCT No.: PCT/US2022/047180
§ 371 (c)(1),
(2) Date: Apr. 25, 2024

(87) PCT Pub. No.: WO2023/076089
PCT Pub. Date: May 4, 2023

(65) Prior Publication Data
US 2024/0419797 A1     Dec. 19, 2024

Related U.S. Application Data

(60) Provisional application No. 63/402,938, filed on Aug. 31, 2022, provisional application No. 63/273,099, filed on Oct. 28, 2021.

(51) Int. Cl.
*G06F 21/00* (2013.01)
*G06F 21/54* (2013.01)
(Continued)

(52) U.S. Cl.
CPC ............ *G06F 21/566* (2013.01); *G06F 21/54* (2013.01); *G06F 21/33* (2013.01)

(58) Field of Classification Search
USPC ......................................................... 726/22
See application file for complete search history.

(56) References Cited

U.S. PATENT DOCUMENTS 9,785,988 B2 * 10/2017 Petri .................. G06Q 30/0609
10,496,823 B2 * 12/2019 Eytan .................. H04L 63/1425
(Continued)

FOREIGN PATENT DOCUMENTS

GB        2626117 A    7/2024
WO    2023/076089 A1    5/2023

OTHER PUBLICATIONS

Javaheri, Danial et al. A Novel Method for Detecting Future Generations of Targeted and Metamorphic Malware Based on Genetic Algorithm. IEEE Access, vol. 9. https://ieeexplore.ieee.org/stamp/stamp.jsp?tp=&arnumber=9422719 (Year: 2021).*
(Continued)

*Primary Examiner* — Jeremiah L Avery
(74) *Attorney, Agent, or Firm* — DLA Piper LLP (US)

(57) ABSTRACT

The present embodiments relate to detecting malware in a document management system (DMS). File stubs representing files remotely stored in a DMS can be presented in file managers at local computing devices for review/interaction on the local computing devices. A file stub for a specific file can be selected in the file manager, and a request to download the file can be provided to the DMS. The process in requesting the download of the file can be processed to determine whether the process is user-initiated or programmatic-initiated. If the process is user-initiated (e.g., initiated by a user on the local computing device), the file can be provided to the local computing device. Programmatic-initiated processes can be a result of software or malware, and mitigating actions can be taken if the request to download the file is a programmatic-initiated process.

20 Claims, 11 Drawing Sheets

(51) Int. Cl.
  *G06F 21/56* (2013.01)
  *G06F 21/33* (2013.01)

(56) References Cited

U.S. PATENT DOCUMENTS

| | | | | |
|---|---|---|---|---|
| 10,762,200 | B1 * | 9/2020 | Salem | G06F 21/54 |
| 10,803,167 | B1 * | 10/2020 | Stanev | G06F 21/53 |
| 11,102,238 | B2 * | 8/2021 | Ackerman | H04L 63/1416 |
| 11,138,313 | B2 * | 10/2021 | Sathyanarayana | G06F 21/566 |
| 11,184,349 | B2 * | 11/2021 | Benkreira | H04L 63/166 |
| 11,210,392 | B2 * | 12/2021 | Salem | G06F 21/564 |
| 2011/0320816 | A1 * | 12/2011 | Yao | G06F 21/32 |
| | | | | 713/176 |
| 2018/0048658 | A1 * | 2/2018 | Hittel | H04L 63/1433 |
| 2018/0181723 | A1 * | 6/2018 | von Muhlen | G06F 16/1774 |
| 2018/0351969 | A1 * | 12/2018 | Macleod | G06F 11/2038 |
| 2019/0095624 | A1 * | 3/2019 | Brumlow | G06F 8/40 |
| 2020/0311268 | A1 * | 10/2020 | Kostyushko | G06F 21/561 |
| 2020/0322360 | A1 * | 10/2020 | Noon | G06F 9/54 |
| 2021/0049272 | A1 * | 2/2021 | Mueller-Wicke | G06F 21/565 |
| 2021/0049277 | A1 * | 2/2021 | Mueller-Wicke | G06F 21/568 |
| 2021/0056205 | A1 * | 2/2021 | Gorelik | G06F 8/61 |
| 2021/0067526 | A1 * | 3/2021 | Fahrny | H04L 63/0823 |
| 2022/0103525 | A1 * | 3/2022 | Shribman | G06F 16/9574 |
| 2022/0114257 | A1 * | 4/2022 | McKerchar | G06F 9/45558 |
| 2022/0292196 | A1 * | 9/2022 | Bhagi | G06F 21/6218 |

OTHER PUBLICATIONS

Evans, Scott C. et al. Network attack visualization and response through intelligent icons. MILCOM 2009—2009 IEEE Military Communications Conference. https://ieeexplore.ieee.org/stamp/stamp.jsp?tp=&arnumber=5379856 (Year: 2009).*

Willems, Carsten et al. Toward Automated Dynamic Malware Analysis Using CWSandbox. IEEE Security & Privacy, vol. 5, Issue: 2 . https://ieeexplore.ieee.org/stamp/stamp.jsp?tp=&arnumber=4140988 (Year: 2007).*

Liu, Zhi et al. Proactive Vulnerability Finding via Information Flow Tracking. 2010 International Conference on Multimedia Information Networking and Security. https://ieeexplore.IEEE.org/stamp/stamp.jsp?tp=&arnumber=5671078 (Year: 2010).*

* cited by examiner

100

Malware 110

Figure 3:
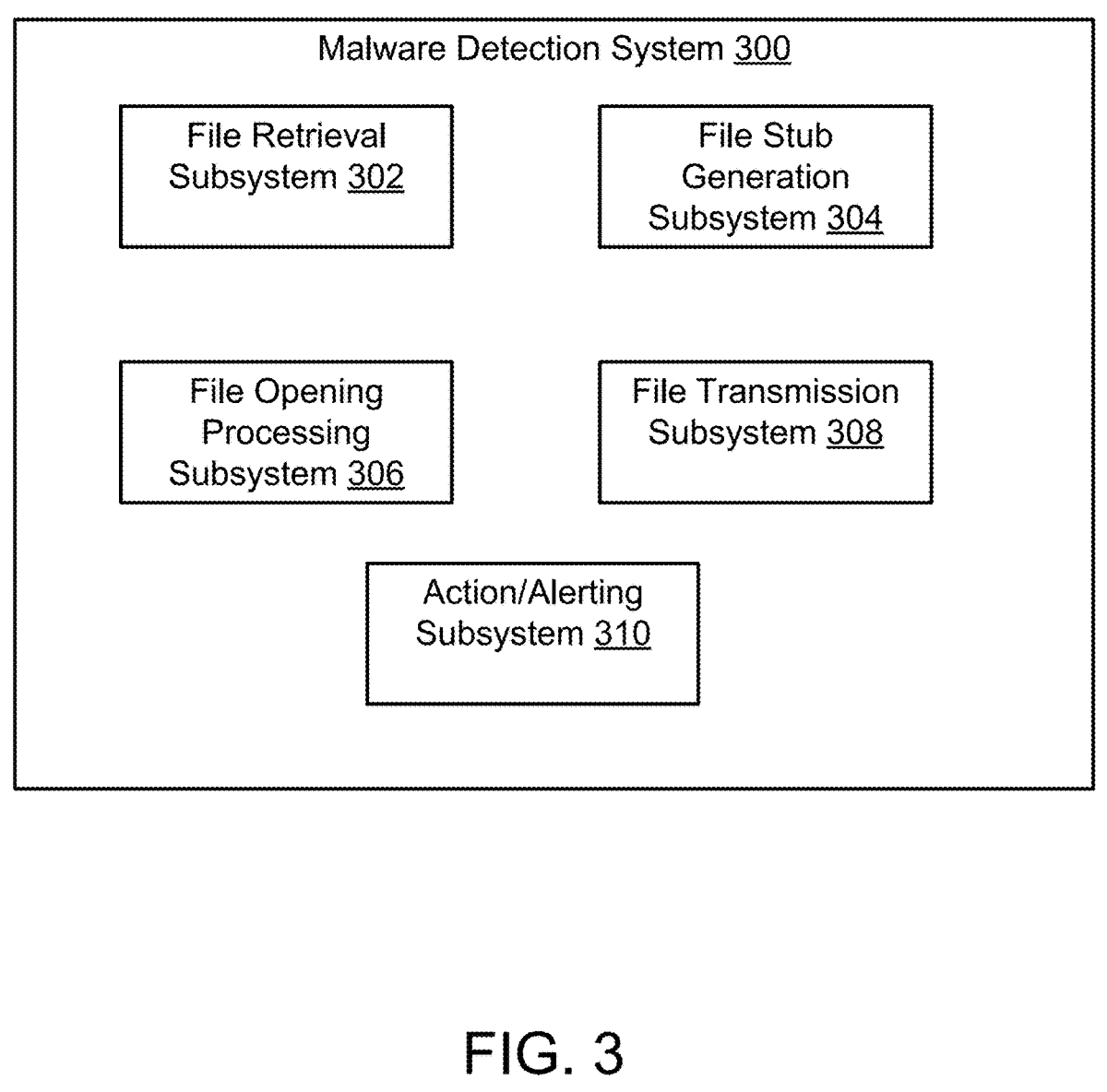

Malware Detection System 300

File Retrieval
Subsystem 302

File Stub
Generation
Subsystem 304

File Opening
Processing
Subsystem 306

File Transmission
Subsystem 308

Action/Alerting
Subsystem 310

Transform the file

802

Rename the transformed file

804

Delete the file

806

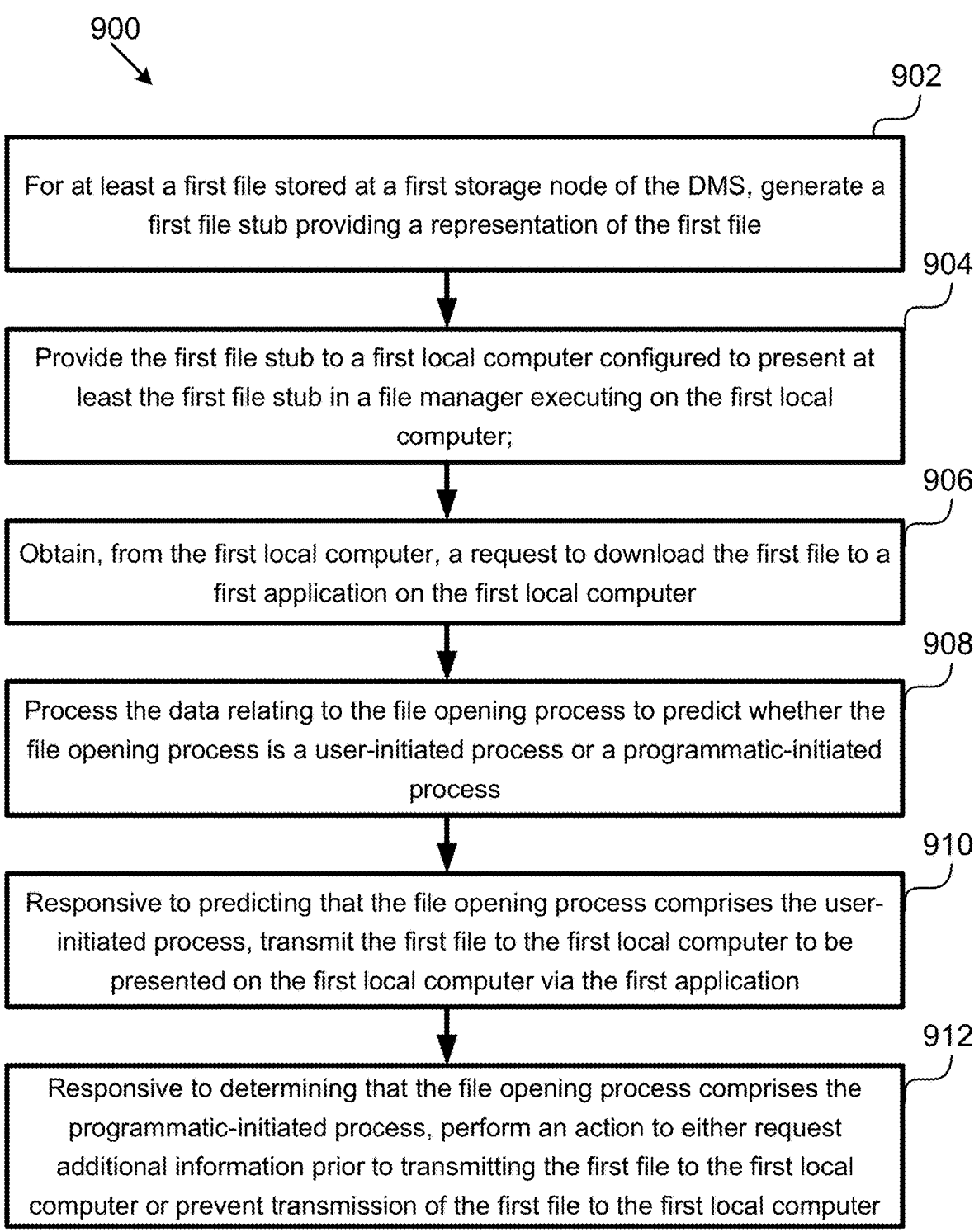

900

902

For at least a first file stored at a first storage node of the DMS, generate a first file stub providing a representation of the first file

904

Provide the first file stub to a first local computer configured to present at least the first file stub in a file manager executing on the first local computer;

906

Obtain, from the first local computer, a request to download the first file to a first application on the first local computer

908

Process the data relating to the file opening process to predict whether the file opening process is a user-initiated process or a programmatic-initiated process

910

Responsive to predicting that the file opening process comprises the user-initiated process, transmit the first file to the first local computer to be presented on the first local computer via the first application

912

Responsive to determining that the file opening process comprises the programmatic-initiated process, perform an action to either request additional information prior to transmitting the first file to the first local computer or prevent transmission of the first file to the first local computer

RANSOMWARE DETECTION AND MITIGATION

CROSS REFERENCE TO RELATED APPLICATIONS

This application is a national phase of International Application No. PCT/US2022/047180 filed on Oct. 19, 2022, which claims priority from U.S. Provisional Patent Application No. 63/273,099, titled "SYSTEMS AND METHODS FOR RANSOMWARE MITIGATION," and filed on Oct. 28, 2021, and U.S. Provisional Patent Application No. 63/402,938, titled "RANSOMWARE DETECTION AND MITIGATION," and filed on Aug. 31, 2022, all of which are hereby incorporated by reference in their entireties.

FIELD

The present embodiments generally relate to computing networks including a document management system (DMS). Particularly, the embodiments relate to detecting malware in the retrieval of remote files from the DMS and mitigate the propagation of malware in the computing network.

BACKGROUND

Remote file systems, particularly professional Document Management Systems (DMS), Record Management Systems (RMS), or other network file systems, often contain unique, valuable, proprietary, confidential secret, irreplaceable, or critical files of various types. In contrast, most local files on a computer are commercial public (OS, applications) or temporary (log files, preferences) and thus easily replaced/recreated and do not contain secrets. Put simply, most local computing devices (laptops, desktops, tablets, and phones) have local file system that can be wiped with little impact, whereas most remote file systems are treasure troves, either in secrets or difficulty to recreate.

The term "file" or "document" can apply more broadly than to just single files, but is also applicable to matter, folders, or other forms of groups of files. Malware such as ransomware, trojans, worms, and/or viruses, may attempt to obtain the valuable files, or information therein, or to prevent or delay the authorized owner from being able to access them. The disclosed systems and methods here provide various methods to detect, delay, resist, deny, or lessen the impact of malware where the user account or device has already been infected by malware.

SUMMARY

In a first example embodiment, a method is provided. The method can be performed by a malware detection system executing on at least one computing device of a series of interconnected devices implementing a document management system (DMS). The method can include, for at least a first file stored at a first storage node of the DMS, generating a first file stub providing a representation of the first file. The first file stub can include a set of details specific to the first file.

The method can also include providing the first file stub to a first local computer configured to present at least the first file stub in a file manager executing on the first local computer. The method can also include obtaining, from the first local computer, a request to download the first file to a first application on the first local computer. The request can include data relating to a file opening process captured by the first local computer.

In some instances, the first file stub comprises any of a file name, a file type, and a version history of the first file. In some instances, the data relating to the file opening process includes a selection of the first file stub on the file manager executing on the first local computer.

The method can also include processing the data relating to the file opening process to predict whether the file opening process is a user-initiated process or a programmatic-initiated process. In some instances, the programmatic-initiated process comprises a software-initiated process to download a file that comprises malware.

In some instances, the data relating to the file opening process includes a certificate for the first application, and wherein the predicting whether the file opening process is the user-initiated process or the programmatic-initiated process includes determining whether the certificate is signed by an entity included in a listing of approved entities for a file type specific to the first file.

In some instances, the predicting whether the file opening process is the user-initiated process or the programmatic-initiated process includes: determining whether the first application is included in a blacklist of restricted applications, wherein the file opening process is predicted as the programmatic-initiated process responsive to determining that the first application is included in the blacklist; and determining whether the first application is included in a whitelist of allowed applications, wherein the file opening process is predicted as the user-initiated process responsive to determining that the first application is included in the whitelist.

The method can also include, responsive to predicting that the file opening process comprises the user-initiated process, transmitting the first file to the first local computer to be presented on the first local computer via the first application.

The method can also include responsive to determining that the file opening process comprises the programmatic-initiated process, performing an action to either request additional information prior to transmitting the first file to the first local computer or prevent transmission of the first file to the first local computer.

In some instances, the method can also include obtaining, by the first local computer, an instruction to close the first file, receiving, from the first local computer, the first file, storing the first file and any revisions made to the first file at the first storage node of the DMS, and recreating the first file stub for presentation at the file manager implemented at the first local computer.

In some instances, the action to request additional information prior to transmitting the first file to the first local computer includes: transmitting, via a second communication channel for a user account specific to the first local computer, a multi-factor authentication message, wherein the first file is transmitted to the first local computer responsive to a successful response to the multi-factor authentication message.

In some instances, the predicting whether the file opening process is the user-initiated process or the programmatic-initiated process includes: determining a first deviance between a time of obtaining the request to download the first file and historical timestamps for requesting download of files, and determining a second deviance between a location of the first local computer at the time of obtaining the request to download the first file and historical locations of the first local computer when requesting download of files, wherein a greater first deviance and/or second deviance increases a predicted likelihood that the file opening process is the programmatic-initiated process.

In some instances, the action to prevent transmission of the first file to the first local computer includes restricting access of a user account associated with the first local computer from making requests to download files and/or limiting a number of requests the user account can provide to download files.

In another example embodiment, a document management system (DMS) is provided. The DMS can include a processor and one or more memory nodes. The one or more memory nodes can include instructions that, when executed by the processor, cause the processor to generate a first file stub providing a representation of a first file.

The instructions can further cause the processor to provide the first file stub to a first local computer configured to present at least the first file stub in a file manager executing on the first local computer.

The instructions can further cause the processor to obtain, from the first local computer, a request to download the first file to a first application on the first local computer. The request can include data relating to a file opening process captured by the first local computer.

The instructions can further cause the processor to process the data relating to the file opening process to predict whether the file opening process is a user-initiated process or a programmatic-initiated process. The predicting of whether the file opening process is the user-initiated process or the programmatic-initiated process is based on a combination of whether the first file stub was selected from the file manager, whether the first application is included in a whitelist and/or a blacklist, and/or whether the first application comprises a signed certificate.

In some instances, predicting whether the file opening process is the user-initiated process or the programmatic-initiated process comprises generating a score for the file opening process, wherein the score is increase responsive to determining that the first file stub was selected from the file manager, thereby increasing a predicted likelihood the file opening process is the user-initiated process.

In some instances, the score is decreased responsive to the first application being included on the blacklist, and the score is increased responsive to the first application being included on the whitelist and/or when the first application comprises the signed certificate.

In some instances, the predicting whether the file opening process is the user-initiated process or the programmatic-initiated process includes: determining a first deviance between a time of obtaining the request to download the first file and historical timestamps for requesting download of files, and determining a second deviance between a location of the first local computer at the time of obtaining the request to download the first file and historical locations of the first local computer when requesting download of files, wherein the score is lowered as the first deviance and/or second deviance increases, specifying an increased predicted likelihood that the file opening process comprises the programmatic-initiated process.

The instructions can further cause the processor to, responsive to predicting that the file opening process comprises the user-initiated process, transmit the first file to the first local computer to be presented on the first local computer via the first application.

The instructions can further cause the processor to, responsive to determining that the file opening process comprises the programmatic-initiated process, perform an action to either request additional information prior to transmitting the first file to the first local computer or prevent transmission of the first file to the first local computer.

In some instances, the instructions further cause the processor to obtain, by the first local computer, an instruction to close the first file, receive, from the first local computer, the first file, store the first file and any revisions made to the first file, and recreate the first file stub for presentation at the file manager implemented at the first local computer.

In some instances, the action to request additional information prior to transmitting the first file to the first local computer includes transmitting, via a second communication channel for a user account specific to the first local computer, a multi-factor authentication message, wherein the first file is transmitted to the first local computer responsive to a successful response to the multi-factor authentication message.

In another example embodiment, a computer-implemented method is provided. The computer-implemented method can include obtaining, by a malware detection system part of a document management system (DMS) from a first local computer, a request to download a first file to a first application on the first local computer based on a selection of a first file stub for the first file. The first file can be remotely stored at a first storage node of the DMS, and the request can include data relating to a file opening process captured by the first local computer.

The computer-implemented method can also include processing the data relating to the file opening process to predict whether the file opening process is a user-initiated process or a programmatic-initiated process.

The computer-implemented method can also include, responsive to predicting that the file opening process comprises the user-initiated process, transmitting the first file to the first local computer to be presented on the first local computer via the first application.

The computer-implemented method can also include, responsive to determining that the file opening process comprises the programmatic-initiated process, performing an action to either request additional information prior to transmitting the first file to the first local computer or prevent transmission of the first file to the first local computer.

In some instances, the data relating to the file opening process includes a certificate for the first application, and wherein the predicting whether the file opening process is the user-initiated process or the programmatic-initiated process includes determining whether the certificate is signed by an entity included in a listing of approved entities for a file type specific to the first file.

In some instances, the predicting whether the file opening process is the user-initiated process or the programmatic-initiated process includes: determining whether the first application is included in a blacklist of restricted applications, wherein the file opening process is predicted as the programmatic-initiated process responsive to determining that the first application is included in the blacklist, and determining whether the first application is included in a whitelist of allowed applications, wherein the file opening process is predicted as the user-initiated process responsive to determining that the first application is included in the whitelist.

In some instances, the action to request additional information prior to transmitting the first file to the first local computer includes: transmitting, via a second communication channel for a user account specific to the first local computer, a multi-factor authentication message, wherein the first file is transmitted to the first local computer responsive to a successful response to the multi-factor authentication message.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the FIG.s.

FIG. 3 is a block diagram of an example malware detection system 300 in accordance with certain aspects described herein.

FIG. 9 is a flow process of an example method for detecting malware in a document management system (DMS).

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

A computer network can be configured to store and manage large volumes of documents or records. For instance, a remote file system, such as a Document Management System (DMS), Record Management System (RMS), or other network file systems, can remotely store and manage documents across one or more computing nodes. The documents stored in such networks can often contain unique, valuable, proprietary, confidential, secret, irreplaceable, and/or critical for a particular entity. For example, an entity can implement a DMS to remotely store a volume of confidential client documents for a plurality of clients.

The computer network can include both local computing devices (or "client devices") and one or more interconnected computer nodes (e.g., part of the remote system as described herein). As discussed herein, the term "server" or "remote" can refer to any data repository, cache, or alternate state local file storage. The file can be locally stored in a compressed, encrypted, transformed, temporary, aggregate, such as in a database, or hidden state.

In contrast to a DMS or RMS as described herein, a local computer can locally store a number of local files that are commercial public (e.g., operating system (OS) files, applications) or temporary files (log files, preferences), which can be easily replaced/recreated and do not contain secrets. In other words, with a number of local computers associated with an entity, each local computing device (e.g., laptops, desktops, tablets, and phones) can include a local file system that can be wiped with little impact to files for the entity as a whole. However, loss of data in a DMS or RMS can be very difficult to re-create or can lead to unauthorized access to confidential data.

Figure 1:
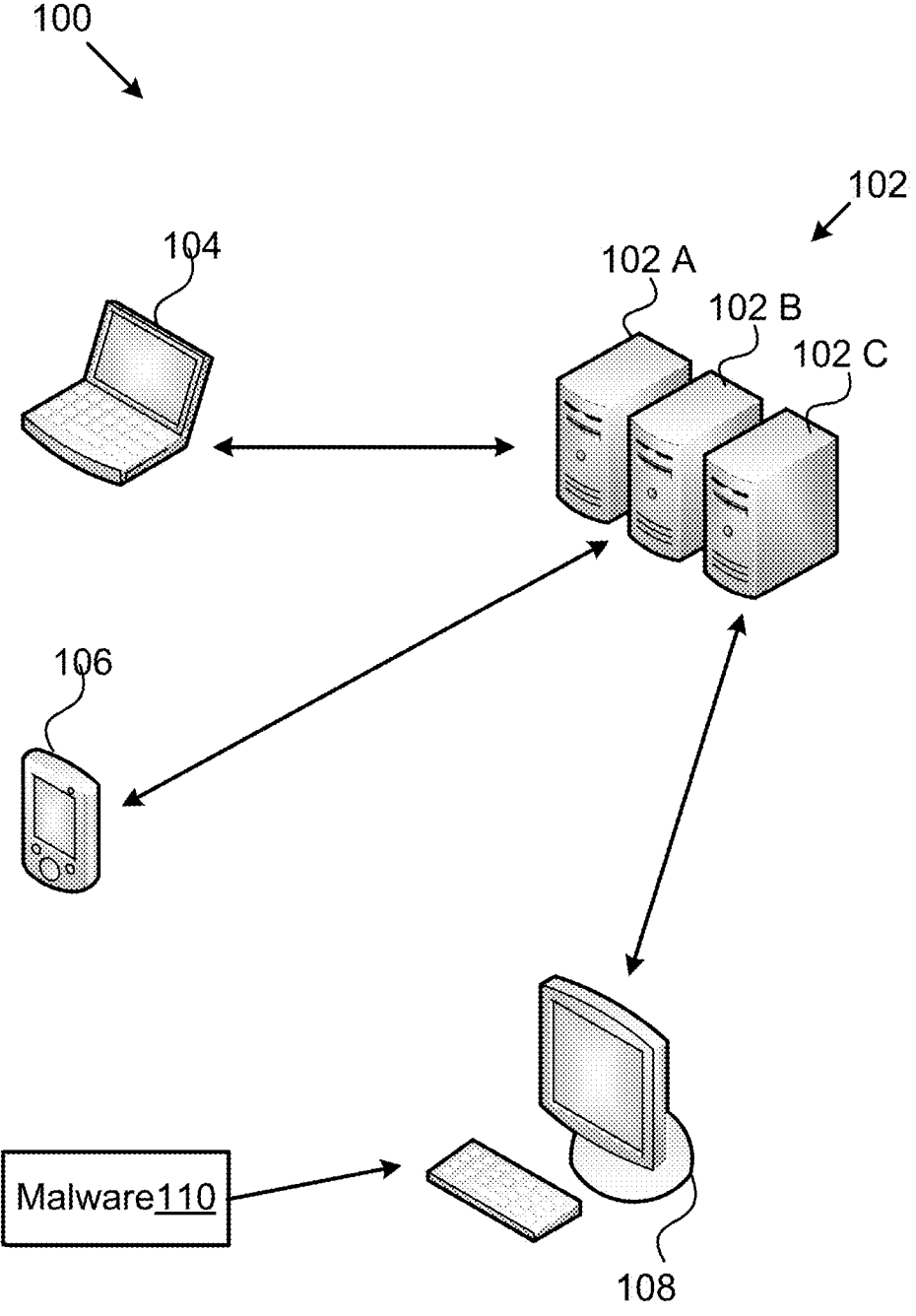
FIG. 1 is an illustration of an example networked system in accordance with certain aspects described herein.

FIG. 1 illustrates a block diagram of a first computer network 100. As shown in FIG. 1, the computer network can include a number of client devices (e.g., 104, 106, 108). The client devices can include desktop computers (e.g., 108), laptops (e.g., 104), mobile devices (e.g., 106), etc. The computer network can further include a number of computing nodes 1 A, 1 B, 1 C part of a series of one or more interconnected computing devices 102 that can implement a DMS or RMS as described herein. For instance, each of the series of interconnected computing devices 102 can store and manage documents as described herein.

In many instances, malware can impact performance of any computing node in a computing network. For example, malware (AA10) can infect a computer 108 part of the client devices. Malware can include various types of software (e.g., ransomware, trojans, worms, viruses) that attempt to obtain files or related data at an infected device or prevent an authorized user of the device from being able to access such files. Various actions can be taken in response to identifying malware being present at a client device, such as to isolate the device from a greater network or to remove files from the device, for example.

Figure 2:
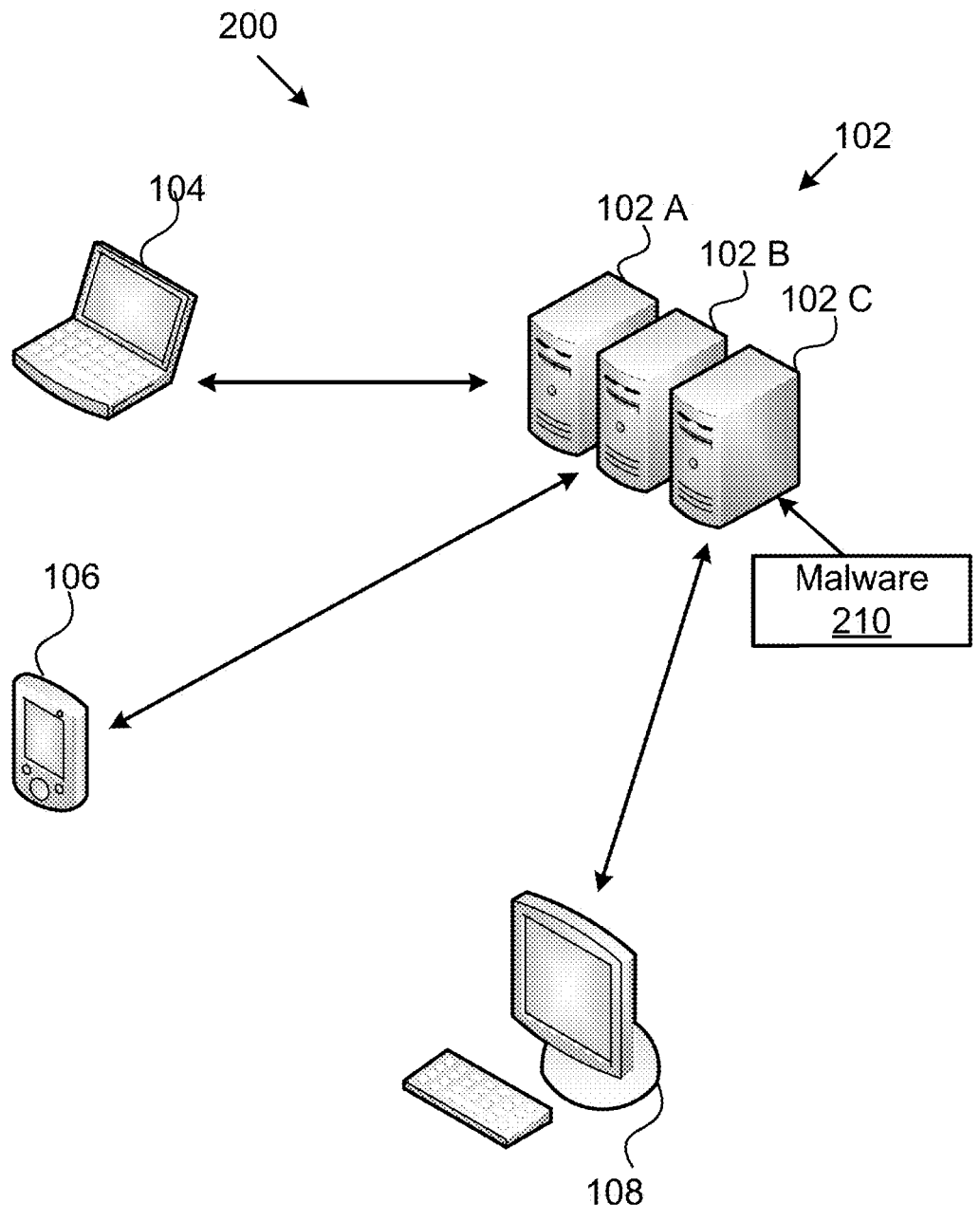
FIG. 2 is an illustration of an example networked system in accordance with certain aspects described herein.

FIG. 2 illustrates a block diagram of a second computer network 200. As shown in FIG. 2, one or more services (e.g., an operating system function, an application, accessory device) for a computing node (e.g., 102 C) that is part of the series of interconnected computing devices 102 can be infected by malware 210.

In some cases, malware can be injected in a communication path within a device or between devices in a computing network such that a portion of a process or application running on a client device can be compromised without an entity or other vendor being alerted to such infection of malware. For instance, a type of attack can include injecting malware to a device such that services in the computing network may not be able to trust its own services. Accordingly, a user account may not have been compromised, and software applications can be monitored, but malware infection still can occur.

The present embodiments relate to systems and methods for identifying and mitigating malware attacks to devices in a computing network. For example, operating system processes can be processed to identify malware and mitigating the transmission of malware by comparing user activity to programmatic activity, comparing application access to expected file types, and/or comparing application access to the certified app creator.

For instance, the present embodiments can mitigate malware by distinguishing user actions from programmatic actions. An example user action can be first viewing a file in a file manager (e.g., Windows Explorer) or viewing an OS file dialog prior to clicking on a file to open the file. Programmatic actions can include directly selecting a document, such as to read a file without any prior way a user interacting with a computer might have navigated to the file (e.g., through a file manager).

As another example, malware can be mitigated by examining aspects relating to a local application that is attempting to access a document. For instance, such aspects can include reviewing a certificate for an application, an allow list of applications, a disallow list of applications, a location of the application, and/or an OS registry file association. In many instances, malware may not be signed by a listed entity (e.g., a trusted company part of a whitelist), and the malware can include instructions to open/read/modify/delete files that the computer would not have created or be associated with in the operating system registry.

As another example, malware can be mitigated by detecting access to dormant files. Unlike many local file systems or consumer remote file systems, document management systems can be primarily used for professional or enterprise services. As such, metadata relating to an enterprise client or enterprise user that created the file can be saved. Further, when the user, client, or matter change states (e.g., the user is removed from a list of users, the document stops synchronizing a matter locally, etc.), the DMS can automatically bulk mark such dormant files. These dormant files can be marked and used to identify potential malware interacting with these dormant files as malware.

As another example, malware can be mitigated due to a unique distinction between a local file system and a remote file system. A remote file system can remain uninfected by malware and can commonly see fewer file operations per user (compared to the large quantity of local file accesses the Windows OS sees), and therefore can act as a gatekeeper in ways that local anti-malware solutions cannot. For instance, a server can see historical and real-time traffic patterns of many users and many devices: developing profiles to detect unusual individual behavior, particularly outside of normal work hours/workdays, even on holidays. Further, the server can continue to inspect the scope of changes (bulk deletions, large changes in a document suggestion encryption or intentional damage) for detection, even if the client inspection code has been circumvented. The server can use multi-factor confirmation (other devices or message paths) of file operations to alert users or stop activity, as the server and other devices/apps may be uninfected even if the primary local device is infected. Additionally, the server can provide near-limitless file recovery, by storing all revisions even if deletion, encryption, or destruction is executed. Whereas a local file system has more limited disk space and operates on many files that are not proprietary or can be easily replaced (operating system, applications). Rate limiting and alerting administrators to high volume can serve as both a detection and anti-denial of service, to avoid filling the server disks.

Malware Detection System Overview

As described herein, a computing network can include a number of local computing devices and a document management system implemented by one or more interconnected servers. Further, the DMS can include a malware detection system to perform file opening processes requested by local computing devices to determine whether malware is likely to exist in any local computing device.

FIG. 3 is a block diagram of an example malware detection system 300. As shown in FIG. 3, the malware detection system 300 can include a file retrieval subsystem 302. The file retrieval subsystem 302 can identify and retrieve a file stored in a storage node of the DMS. For instance, files can be stored in storage nodes across the DMS, with each file stored based on a file type or client associated with the file. In some instances, upon generation of a file at a local computing device, the new file can be stored at the DMS and identifiable within the DMS.

The malware detection system 300 can also include a file stub generation subsystem 304. The file stub generation subsystem 304 can translate a file into a file stub, a representation of the file that can uniquely identify each file. For instance, a file stub can provide a file name, file type, version history of the file, etc. The file stubs for each file can be presented on a file manager configured to be presented on a local computing device. A user can interact with the file manager to view and select a file stub to download the full file as described herein. To download a requested file, the local computing device can provide a request to download a file from the DMS, which can include a file opening process providing details into the request to download the file.

The malware detection system 300 can also include a file opening processing subsystem 306. The file opening processing subsystem 306 can review data for the file opening process and predict whether the file opening process is a user-initiated process or a programmatic-initiated process. A user-initiated process can include a request to download a file initiated by a user interacting with a file manager on a local computing device. In contrast, a programmatic-initiated process can include a request to download a file by software, which can include malware. In many instances, identifying the request as part of a programmatic-initiated process can result in additional actions being taken to mitigate the risk of malware being propagated to other parts of the computing network or to corrupt the file.

Various aspects can be taken into consideration to determine whether the file opening process is a user-initiated process or a programmatic-initiated process. For example, a combination of considerations can be processed to determine whether the file opening process is a user-initiated process or a programmatic-initiated process, such as whether an application to open the file is part of a blacklist, whether the application is part of a whitelist, whether the application includes a signed certificate, a time/location of the request, whether the file stub was selected (e.g., clicked on) in the file manager, which operating system calls initiated the request, whether user-helpful information was requested (such as file icon), etc.

The malware detection system 300 can also include a file transmission subsystem 308. The file transmission subsystem 308 can transmit a file to the local computing device responsive to determining that the file opening process is a user-initiated process. In some instances, the file can be sent to the local computing device after performance of an additional action by the local computing device as described herein. The file downloaded to the local computing device for editing, and edits made can be stored and tracked by the DMS to track edits and versions of a document.

The malware detection system 300 can also include an action/alerting subsystem 310. The action/alerting subsystem 310 can either request an additional action to be performed by a user at the local computing device or generate an alert responsive to determining that the file opening process comprising the programmatic-initiated process. Actions can include transmitting a multi-factor authentication message to verify an identity of a user or rate-limiting downloads for the user account, for example. The alert message can alert an operator of the DMS to review the download request to take further action if malware is detected.

File Stub Information and File Content Transfer

Cloud storage, server files, or any files remote to a client device can often be presented as though they exist on a client device (or local computing device), even if the files are not presently taking up memory space on the client device. Rather, a file stub for the file can be provided on the client device, which provides minimal information for the file, such as the source, file name, file size, file modified date, file type, and thumbnails, etc. In some instances, various techniques can be used to present remote files to a client device, such as virtual drives, listings browser windows, remote desktops, or local client applications, for example.

Figure 4:
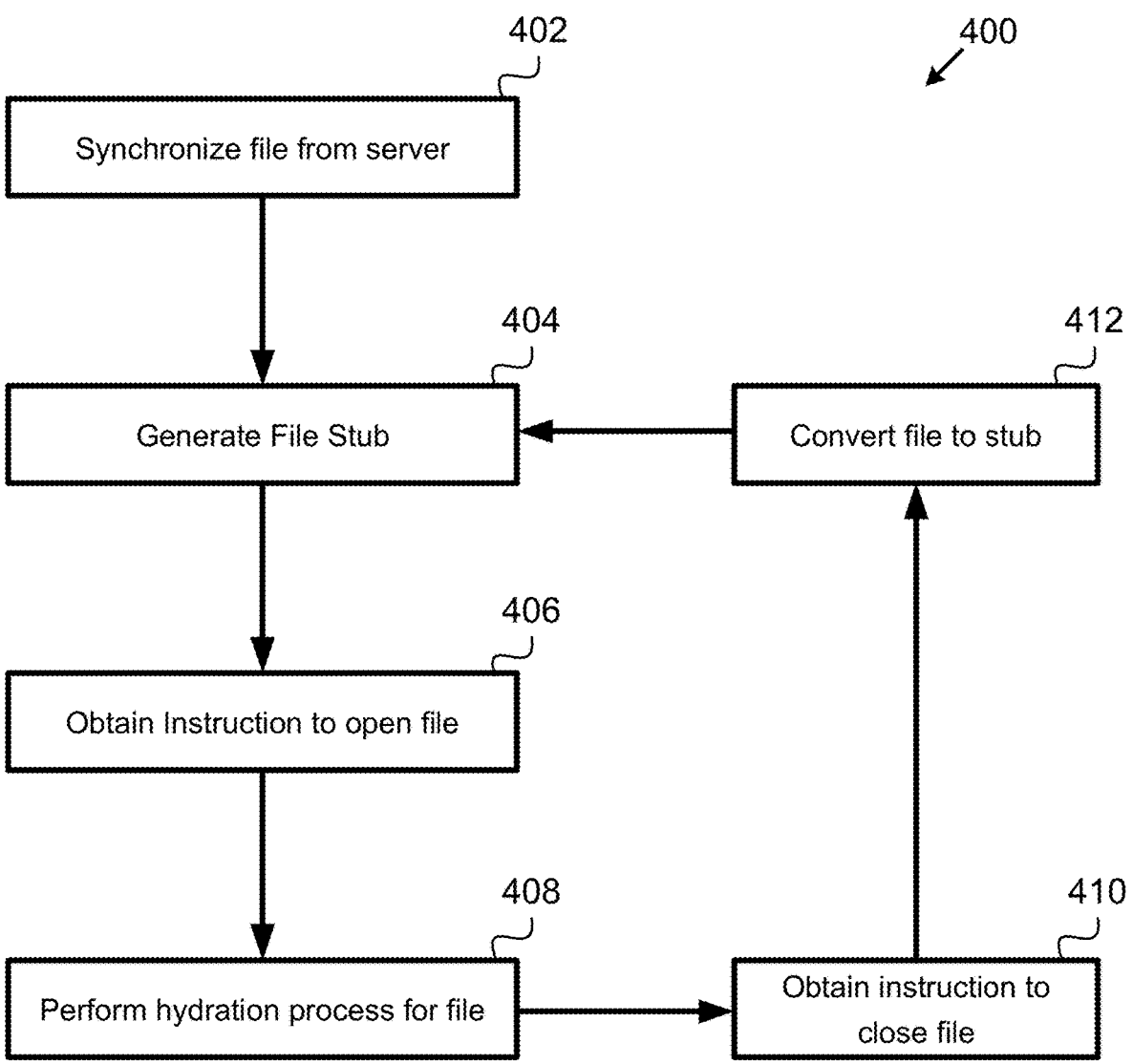
FIG. 4 is an illustration of an example method in accordance with certain aspects described herein.

FIG. 4 is a flow process of an example method 400 for obtaining stub information and determining when to transfer contents of a file. At 402, a file can be synchronized from a server. For instance, the server can identify a file in a data repository and retrieve relevant data for the file. The file and corresponding metadata can be stored at one or more data repositories for a number of computing nodes comprising the DMS or RMS as described herein.

At 404, the file stub can be generated. The file stub can include a minimal representation of the file providing details relating to the file but not the entire file itself. For example, the file stub can provide a file name, a source of the file, a file number specific to the file, etc. The file stub can be presented on a file manager or document interface for selection by a client via a client device.

At 406, an instruction can be obtained to open the file. For example, a client, via a client device, can navigate a file manager to review the file stub and select the file stub in the file manager. For example, the file stub can specify the document details and a document type, and the client may want to modify or edit features of the full file. In some instances, multiple clients may edit a single file in multiple versions over time.

The instruction by a client can include an example of an authorized user-based action or expectation. In this example, the user can explicitly request access to the specified document by clicking on the file stub. In some instances, the client can provide other actions to a file, such as to read, edit, delete, or rename a file. By obtaining a selection of a file, the file can be transferred from remote storage or protected/resized local storage to a standard locally accessible form on the client device.

At 408, a hydration process can be performed for the file. A hydration process can include converting, transforming, swapping, synchronizing, and/or replacing the local file stub with the full file remotely stored by one or more servers, or partial contents of the file in the case of streaming or when only partial access is necessary to fulfil adequate local access. After hydration, the file can be accessible on the local computing such that the client can take actions on the file, such as to edit the file, for example. In some instances, hydration can refer to a client clicking a link on a browser or selecting a file in a desktop application to request the full file being retrieved and downloaded to a local computer.

At 410, an instruction can be obtained to close the file. For example, after viewing and/or editing by a client, the client can close the file or otherwise request the file be checked back into the DMS/RMS. The file can be returned to the server and replaced locally with the file stub as described above. In some cases, the metadata for the file can be updated, such as a version of the file, edits made to the file, any newly provided data for the file, etc.

At 412, the file can be converted into the stub. The file stub can display locally at the client device. The file stub can be presented on a file manager for subsequent selection by a client as described herein.

In some embodiments, the hydration process can be visible to the client, particularly if there is a delay or uncertainty about a successful operation, such as downloading a file from a website. A file progress indicator may be presented on the user interface. In other cases, the hydration may be hidden because it may not be necessary for the user to know the file in being unencrypted, decompressed, or synchronized from another storage location.

Unlike documents that a client may want to read, modify, delete, or rename, there can be many more types of local files that the user does not know exist and may not be aware of what operations are performed on them as the long as the computer keeps working. For example, launching an internet browser or a document application (e.g., Microsoft Word) may cause hundreds of local file operations, such as loading libraries, reading preference file, etc., but the user does not want to be informed that such things such as opentcp.dll is being read and executed, or that temp.log has been deleted and a new one created.

Detecting Malware Based on File Opening Process Characteristics

In some instances, a process can expect a client-initiated request for access to a file, and such a process can be used to resist various types of malware. In contrast to such processes, malware can rapidly attempt to traverse many files to view file contents, delete the files, and/or encrypt the files. The difference(s) between a client-initiated process and a malware-related process can assist in identifying malware.

Further, detecting that an application other than an expected application (e.g., Microsoft Word for a Word document) or an operating system file manager has accessed one or more files may be an indication of malware. Further, other factors can be processed to determine whether malware is present can include determining how rapidly multiple files are accessed, when the access occurs on files that have not been read in considerable time, and/or when access occurs outside of normal business hours, for example.

Either the server or the client, upon detecting malware, can take an action to not hydrate the file locally to prevent it from being read/modified. In such examples, the local file system or operating system can be inherently able to deny read/write access to files that have not been hydrated, even if those systems have been compromised.

Figure 5:
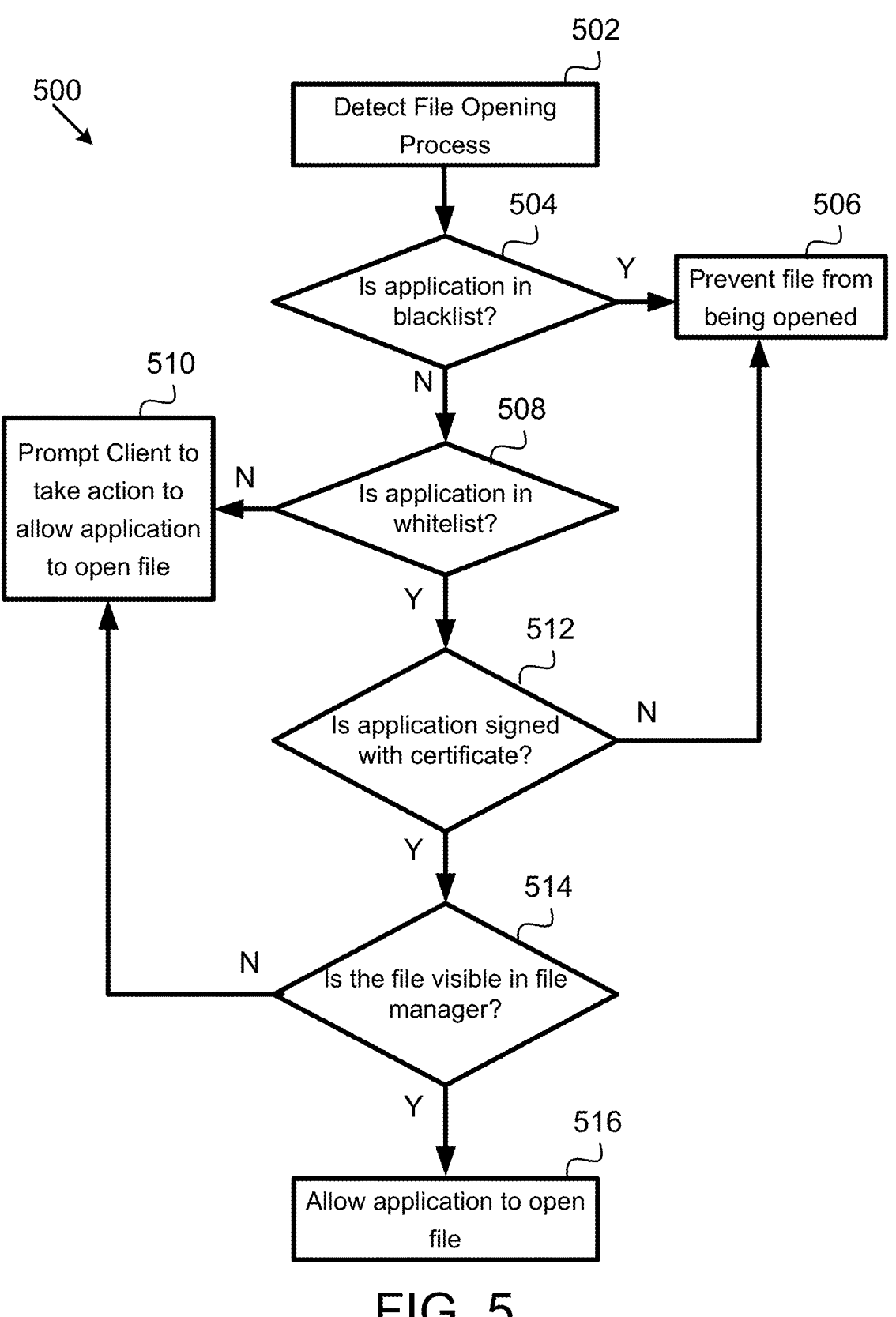
FIG. 5 is an illustration of an example method in accordance with certain aspects described herein.

FIG. 5 is a flow process of an example method 500 for determining whether to allow a file to be opened on a local computer. At 502, a file opening process can be detected. A file opening process can include tracking a number of steps or actions relating to a selection to open a file. For instance, a file opening process (e.g., a user-initiated file opening process) can include a client (or user, identifiable via a username or user account), via a client device, interacting with a file manager to identify a file stub for a first file and select the first file (e.g., by clicking on the file stub). As another example, a file opening process (e.g., a process initiated by malware) can include a large number of files being rapidly accessed without prior interaction with a file manager or a file being opened by an application that is not part of an application whitelist. Upon determining that a file opening process may include a process initiated by malware, additional actions can be required to open the file, such as to prompt a client to take an action, or to prevent the file from being opened.

At 504, it can be determined whether an application is part of a blacklist. A blacklist can include a series of applications that are not allowed to be used to open a file. For example, the blacklist can include applications implementing a terminal view or an application programming interface (e.g., XML) viewer. The file opening process can include a specified application in which the file is to be opened, and the specified application can be compared against the blacklist to determine whether the application is part of the blacklist. If the application is not part of the blacklist (e.g., determining "NO" in 504), the process can continue.

At 506, if the application is part of the blacklist (e.g., determining "YES" in 504), the file can be prevented from being opened. In this instance, the file opening process can be repeated using a different (non-blacklisted) application. In some embodiments, an alert can be generated and/or the account used to attempt to open the file can be restricted from subsequent attempts to open files.

At 508, it can be determined whether the application is part of a whitelist. In contrast to the blacklist, a whitelist can include a listing of applications that are allowed for a specific file. In some instances, the whitelist can be specific to a file type. For example, if the file type is a ".docx" file, the whitelist can include Microsoft Word. If the application is part of the whitelist (e.g., determining "YES" in 508), the process can continue.

At 510, if the application is not part of the whitelist (e.g., determining "NO" in 508), a prompt can be provided to the client device to take an action to allow the application to open the file. The action can provide a prompt for a client to select, such as a query of whether the client would like to open the file using the selected application. In some instances, the prompt can include a security prompt (e.g., a CAPTCHA) designed to only allow a user to successfully complete and prevent malware or other computer-implemented processes (e.g., bots) from completing the prompt.

At 512, it can be determined whether the application is signed with a certificate. As described below; an application can be signed with a certificate specifying details about an entity that provides/develops the application. Details regarding identifying a certificate and verifying a validity of a certificate is described with respect to FIG. 7 below. If the application is signed with a certificate (e.g., determining "YES" in 512), the process can continue. If the application is not signed with a certificate (e.g., determining "NO" in 512), the file can be prevented from being opened (e.g., in 506). If the application is not signed by a certificate, the application can be vulnerable to malware, and the file can be prevented from being opened with such an application.

At 514, it can be determined whether the file is visible in a file manager. For example, this can include determining whether the file stub relating to the file is presented in a file manager (or file explorer). The file (or file stub) being visible in the file manager can be indicative of the client initiating the file opening process. If the file (or file stub) is not visible in the file manager, it can be indicative of a malware-initiated process. If the file is not visible in the file manager (e.g., determining "NO" in 514), the prompt can be provided for the client to take action to allow the application to open the file (e.g., in 510).

At 516, responsive to determining that the file is visible in the file manager (e.g., determining "YES" in 514), the application be allowed to open the file. This can include downloading the file from the remote server to the local computer and allowing the application to present the file on the local computer. The client can then view and edit the file.

After closing of the file, the remote server can identify and track all revisions made by the client.

File Manager Overview

Figure 6:
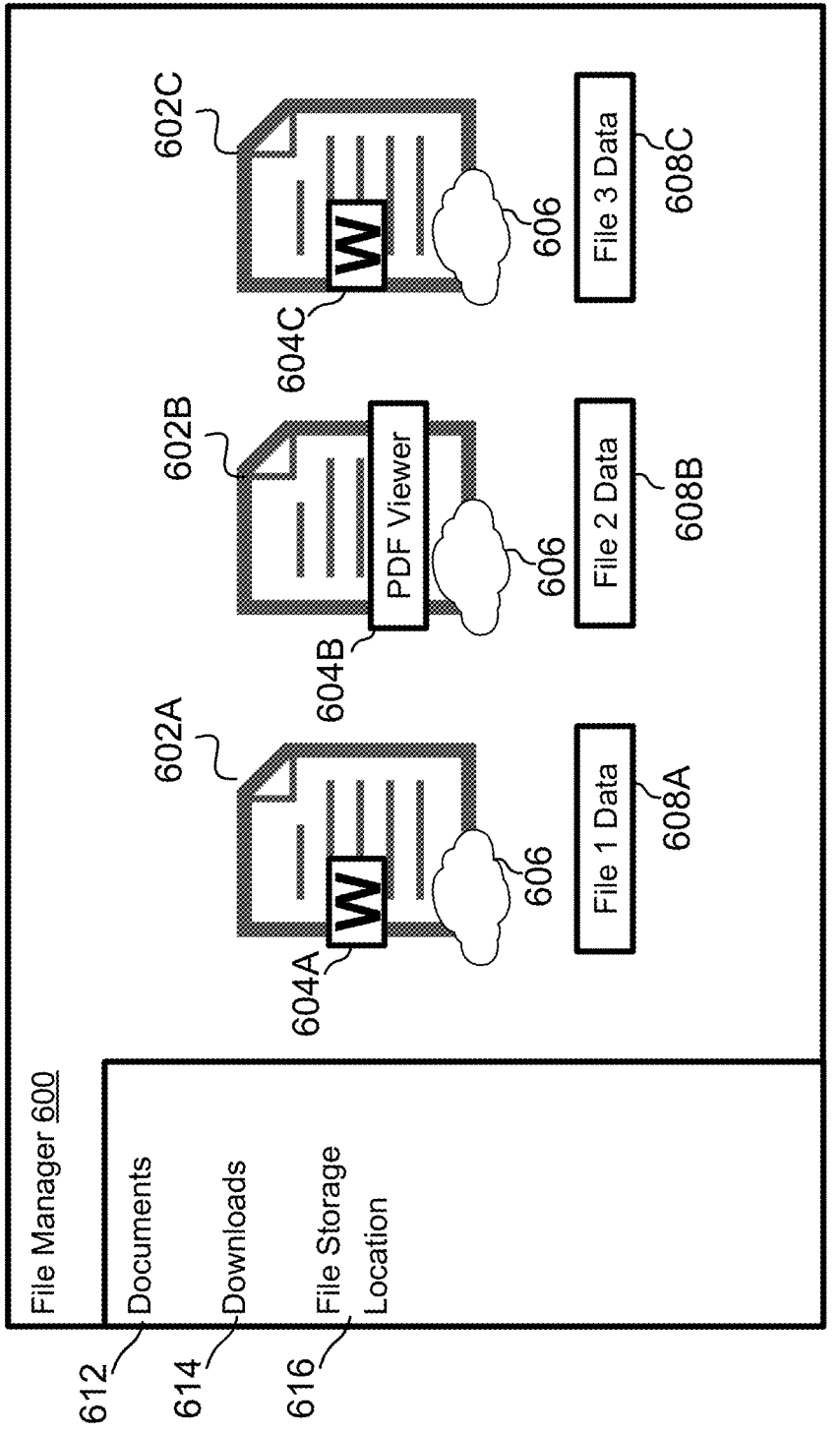
FIG. 6 is a user interface example in accordance with certain aspects described herein.

As described above, prior to hydrating a file and downloading the file to a local computer, the file stub can be provided on a file manager. The file manager can include an interface allowing for interaction with folders, repositories, etc., to identify and select a file for download. FIG. 6 illustrates an example file manager.

As shown in FIG. 6, the file manager 600 can allow for interaction with files (e.g., 602A-C) of varying file types. Each file 602A-C can include a file stub as described herein. For example, a first file 602A can include a file stub for a word document, a second file 602B can include a file stub for a PDF document, and a third file 602C can include a file stub for another word document. Further, the first file 602A can be associated with an application (e.g., Microsoft Word). The files 602A-C can also include an indicator (YY06) that the files are remotely stored and file data (YY08A-C) specifying various aspects of each file stub.

As shown in FIG. 6, the file manager can provide a user interface that is responsible for obtaining or hydrating files can detect whether a file is first accessed through the user interface to detect whether or not file access is due to user action or programmatic action. Some other common user interfaces can include a result screen of a search box and/or a third-party file manager that can handle long file names or remote access.

The file manager can include both the operating system of navigating to a file before opening an application as well as an interface to open a file within an application. The term file manager can include any user interface that displays file names and/or icons.

When a user is selecting a file to open/modify, the operating system or other local file may present a visual icon 602A-C of each file, filename, extension, file details, or other file attributes to the user in a user interface. The server or client software can remember that this request occurred before a file open/modify request, as it can be indicative of a user-initiated activity. Additionally, the server or client software can use the processes described elsewhere in this disclosure to limit which applications/processes are accepted as sources of user activity, such that malware simply cannot request a file icon before opening a file to get around the restriction.

The method of determining whether a file has been viewed by the user first may be updated to remove that file from the user interface list due to time, login, logout, reboot, exiting program, file being programmatically closed, the file is updated locally or remotely, network connection change, device dock changed, time of day has changed, or from long user inactivity (lack of any activity from this user, as opposed to a fixed timer or user activity on this specific file).

In some instances, the file manager can be used to interact with various folders and locations across the local computer or across a computer network. For example, file storage locations 612, 614, 616 can be viewed by a client for reviewing various files within each location. For example, a separate storage location can be maintained for each client of an entity. Further, the file data 608A-C for each file can specify aspects of each file, such as a file name, file type, etc. A user can review file data or select a file for opening by selecting an icon 602A-C.

In some embodiments, the application used to open a file can include an application not on a whitelist or included in a blacklist. For instance, the system can determine that an application configured to open file 602C is not included in a whitelist. Identifying that the application specified to open the document is not in a whitelist or in a blacklist can be used to prevent access to the file as described herein.

Certificate Overview

As noted above, an application can include a corresponding certificate. The certificate can provide details relating to an application. Further, as described herein, if an application does not include a certificate or includes an incomplete certificate, the system can determine that the file opening process may be malware related.

Figure 7:
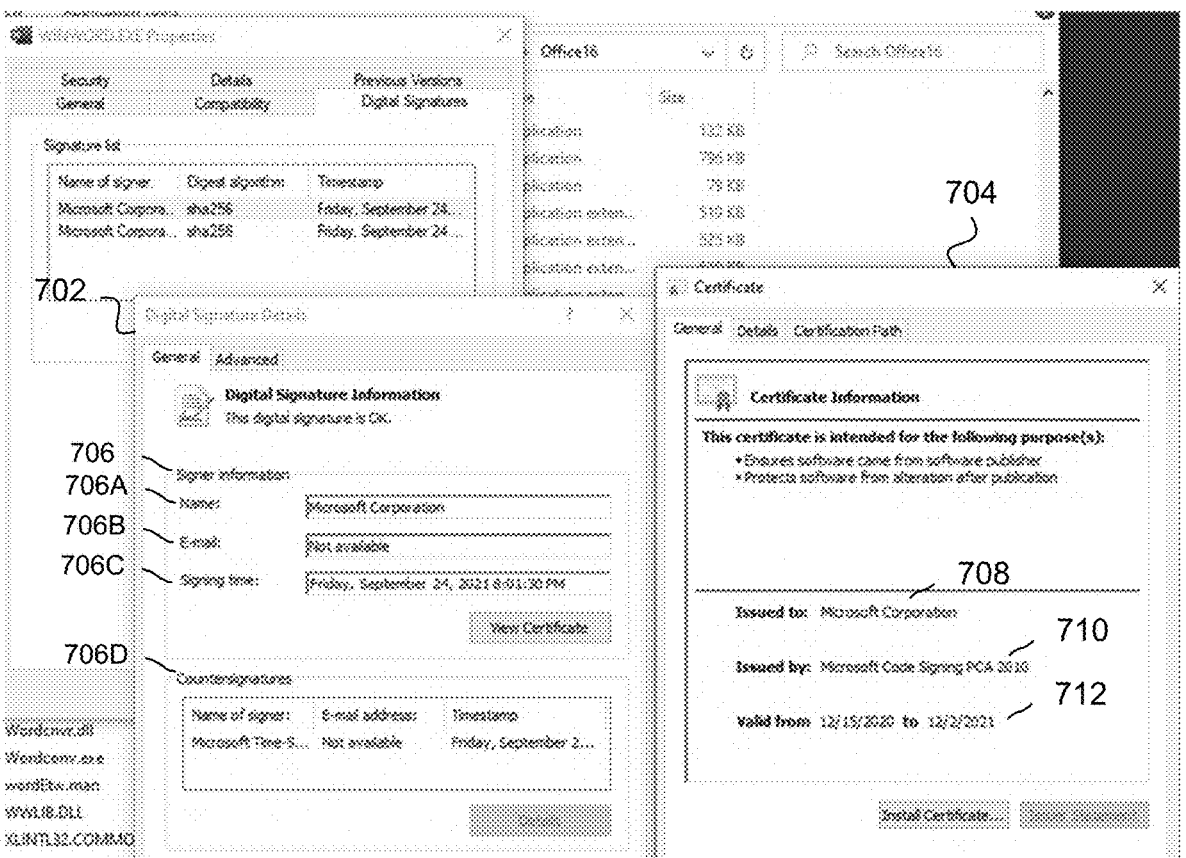
FIG. 7 is a user interface example in accordance with certain aspects described herein.

FIG. 7 shows an example user interface with information provided by an application certificate. As shown in FIG. 7, an interface 702 showing digital signature details can be provide along with a certificate 704 for the application. Further, the digital signature details can show signer information 706 including a name of the entity signing the digital signature 706A, an email for the entity 706B, a timestamp for the digital signature 706C, and/or countersignatures for the digital certificate 706D. These details can be used to verify an application used to open a selected file.

Further, the certificate 704 can include an entity the certificate is issued to 708, an entity issuing the certificate 710, and a range of dates that the certificate is active 712.

The systems and methods here may use information about the certificate to restrict access to particular files. For example, the systems and methods here could be configured to require applications be signed before hydrating a file that the application was trying to perform a file operation. This alone can provide protection, particularly when the operating system cannot be configured to restrict execution due to a number of uncertified applications being required on a device for other reasons.

Furthermore, the systems and methods here could require that only applications signed with a specific certificate, or with a particular vendor identity be permitted file operations on particular documents. For example, only executables signed with a "Microsoft Corporation" name would be permitted access valuable files or be permitted to access to ".docx" or ".doc" file types.

In some instances, it can be relatively easy for malware to spoof the name of an executable in order to work around an allow list of executable names. More sophisticated malware can even be signed by a certificate, such as stolen from or created by shell entity. However, the disclosed systems and methods here can restrict malware to needing to be named specifically "winword.exe." signed by a valid "Microsoft Corporation" certificate, which may require a very serious breach of global security to maliciously duplicate these details, and even then that specific malware executable would only be able to access "docx" types. Such malware would need to have additional executables suitably named and signed to access other types, which can make malware extremely unlikely to be present in such a scenario.

In these cases, a remote document management system can have a capability not available to some malware tools and operating systems. The remote file servers can understand which files are special verses which are ordinary (as the special files are in the remote repository) and the remote file servers can have the ability to deny access or provide alerts even when the client machine is infected.

Application Restriction Examples

As noted above, malware can be detected based on examining a relationship between the file and application/process which is performing a file operation. A straightforward approach can be to use an allow list (e.g., a whitelist) or disallow list (e.g., a blacklist) of application/process names. However, there can be additional mechanisms present in many operating systems that can be used for malware detection.

A first operating system feature which can be used can be file association. When a user double-clicks on a file in a file explorer, the operating system may need to know which application should open the file. This association may be in the registry, a database, preferences, or even metadata of the file itself. The operating system may not use this information to restrict access to the file, but instead only to determine the default application. By examining which application the user expects to be opening a particular file type, the disclosed systems and methods here can restrict file access, such as by not hydrating the file.

File association can be further strengthened by the fact that many operating systems usually restrict modification of the association. For example, each browser may try to take over the default association for html documents. Although the operating system could allow malware to operate on any document, the disclosed systems and methods here can prevent the operation (perhaps prompting the user if they intend to use a different application or using an allow-list override), and the malware may be unable to change the file association because the OS prevents such file association.

A second operating system feature can include application certificates. A certificate can be usually issued by a third-party which validates the identity of the certificate owner. The certificate may also include a private/public key or method of mathematically summing the value of the bytes in a document or executable. A primary purpose of associating a certificate with an application can be to programmatically validate that the application has not been altered since being generated by the certificate owner. The operating system may permit users or administrators to restrict which application may execute on a computer, based on whether they are signed by a certificate. But, the operating system may not use the certificate to associate files with applications or restrict access to those files.

Mitigating Data Loss and Alerting

As described above, malware can be detected as attempting to access one or more files stored in a DMS/RMS. Regardless of how malware is detected, there are a number of ways of reducing or preventing damage or generating alerts identifying the malware.

Techniques for mitigating data loss and generating an alert can include denying file access, throttling or slowing down file access, alerting the user or an authority for the RMS/DMS, requiring further user confirmation, suspending user access, and/or backing up file or creating independent version or creating change point labels.

In many instances, server disk storage may be a relatively inexpensive resource. Server disk storage may be easily expanded based on need. In comparison, there may be limits on the size and quantity of local disks, such as in a laptop, desktop, phone, or table. As such, servers can provide near-limitless file recovery to resist malware damage, by storing all revisions of a file even if a deletion, encryption, or destruction event occurs. This may not be a reasonable technique for a local file system, as it has more limited disk space and operates on many files that are not proprietary or can be easily replaced (operating system, applications). For example, it may make no sense for a laptop to back up every change to a log file or preferences file. Whereas a remote system understands the files it manages are more valuable, and thus worth preserving all changes.

Further, the disclosed systems and methods here can be implemented to include rate limiting and activity volume monitoring/alerting. Thus, this can act as both a malware detection method and anti-denial of service, while avoiding filling up the server disks.

The disclosed systems and methods here provide an approach to alerting on file operations. For instance, alerting or requiring permission on secondary clients or devices can increase data protection. This is generally called two-factor authentication or multi-factor authentication. However, this technique has not been applied to file operations, particularly to resist malware. Instead, multi-factor authentication is usually limited to logging in or changing passwords. It may be burdensome if every file access on a computer, whether programmatically or initiated by a user required confirmation via a secondary process or device.

While secondary confirmation can be applied to specific folders, such as the Windows operating system folder, or to the installation/modification of executables, it may exclude application access to commonly modified files, such as user documents. The solution can be to apply multi-factor authentication only a limited set of documents, which have been identified as being special or valuable. The specialness threshold may be based on the documentation type, or it may be based on that the remote file system manages those specific documents, or it may be due to the rate of file requests or time/geography of the requests. Alternatively, it may be that certain documents can be marked automatically (such as by author, client, or content) or manually to being a higher sensitivity, and therefore worthy of multi-factor protection.

Malware File Transformation Examples

As described above, malware may attempt to gain access from an infected local computer to files at a server part of an RMS/DMS. For instance, if the malware gains access to a file, the malware may attempt to modify aspects of the file to destroy the file or encrypt the file as part of a ransom.

Figure 8:
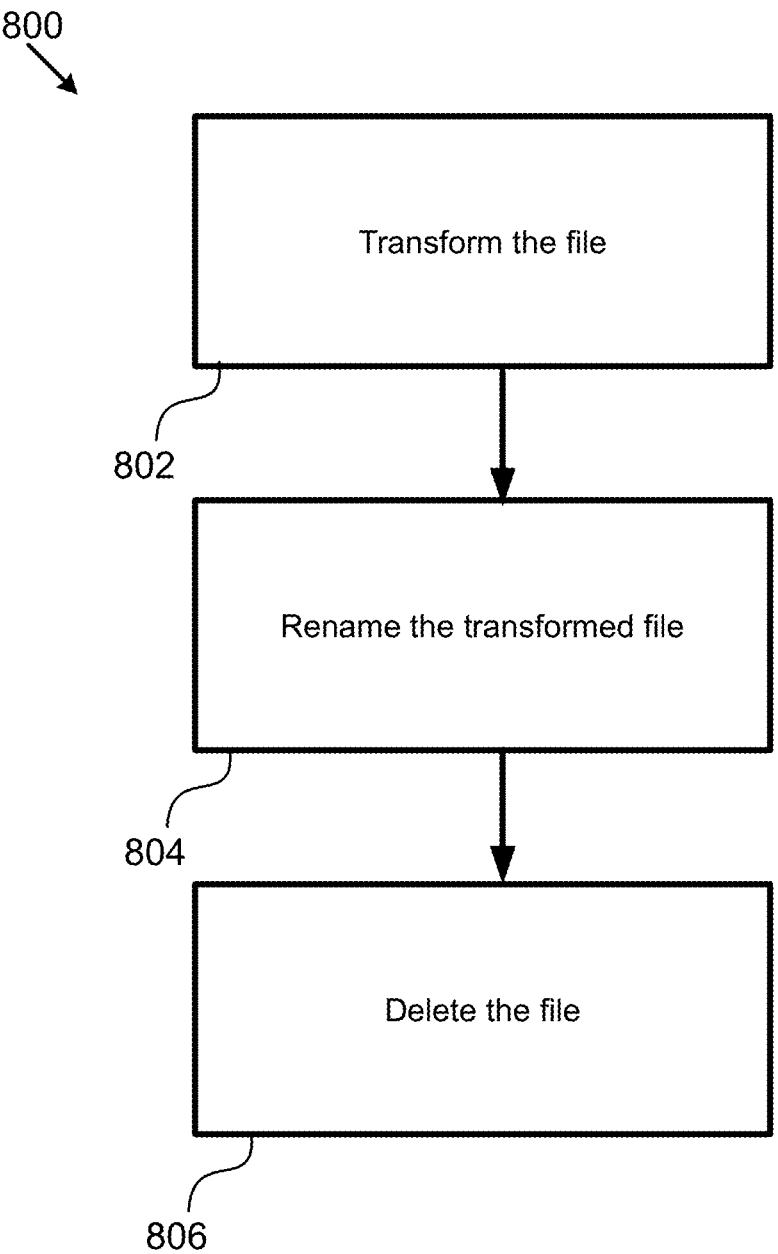
FIG. 8 is an illustration of an example flow chart in accordance with certain aspects described herein.

FIG. 8 is an example method for how malware can transform a file. In the example, the malware may attempt to transform files in a way that they are no longer useful to the user 802 but such that they can be converted back to their original state via a utility that would be provided once a ransom is paid.

Example ways that malware may transform a file can include encrypting files with a private key, encrypting files with intermittent encryption to avoid detection that a file is encrypted, making the top of the file empty and move some of the data to the bottom of the file, renaming the files after transforming them such that the original files do not exist 804, renaming a copy of files with a new extension and transform the copy and/or after transforming the copy, deleting the original file 806.

Because many operations require a transformation of files by the malware, it may be desirable to detect such unauthorized transformation. For example, ways to detect unauthorized transformation of files include, but are not limited to: detect that files were encrypted (already known in the arts), detect that files were renamed to an invalid file name extension or that don't correspond to set of acceptable extensions based on the original extension, detect that files or folders were deleted, detect that a large number of files were modified in a specified amount of time, detect that the files that were deleted were not browsed by the user using an application such as Windows explorer or Mac finder, detect if the program that executes the transformation is in a blacklist of programs not allowed to execute the transformation, and/or detect that the file no longer passes an integrity check, such as a "docx" file being readable by an "open xml" library.

Once an unauthorized transformation of files is detected, there can be a number of ways of reducing or preventing the unauthorized transformation of files. Those include, in any combination, but are not limited to denying all file or folder renames, modifications, or deletions, requiring user confirmation to approve changes to files that have been encrypted, requiring user confirmation to approve file or folder renames, modifications, or deletions, requiring user confirmation to approve file or folder renames, modifications, or deletions if the file or folder was not viewed in an application such as Windows explorer of Mac finder. The files and folders that are viewable in Windows explorer and Mac finder can be kept track of and used to determine whether to allow a file or folder rename, modification, or deletion. Another set of actions can include requiring user confirmation to approve file renames, modifications, or deletions if the number of files renamed, modified, or deleted in a certain time frame was greater than the configuration of the number of file renames, modifications, or deletions allowed, requiring user confirmation to approve folder renames or deletions if the number of folders renamed or deleted in a certain time frame was greater than the configuration of the number of folder renames, or deletions allowed, denying the file or folder rename, modification, or deletion if the program that executes the file or folder rename, modification, or deletion is in a blacklist of programs that are not allowed to do the file or folder rename, modification, or deletion, and/or denying the file or folder rename, modification, or deletion if the program that executes the file or folder rename, modification, or deletion is not in an allow list of programs that are allowed to do the file or folder rename, modification, or deletion.

Profile and Circumstances Examples

Malware may alternatively or additionally attempt to manipulate or transform more than one file at a time. Common bulk file operations such as "delete folder" or selecting multiple files such as "select all" are ways in which a user may tend to delete, move, or rename multiples files in a bulk fashion. In contrast, programmatic bulk operations on files tend to be on a file-by-file basis instead of being preceded by a select all or folder delete. Software that is integrated into a larger document storage repository may have unique visibility into the behavior of all users such that the maximum or above average rate of bulk operations for any particular user basis can be determined programmatically. Unusual behavior within a particular firm may be determined or detected automatically using the systems and methods described herein.

Malware often activates at times and days when users are less likely to notice it, such as after normal work hours, on the weekend, or on holidays. Given that a document management system may have information on the behavior of more than one user, it can be provided the special ability to determine abnormal activity periods. Many document management systems ("DMS") are large enough to include multiple offices or users from multiple regions, particularly with post-covid remote workers. Thus, a DMS can be record an activity profile by user, office, or region.

The user profile can be historical and/or real-time. For example, if most users at a firm have ceased or reduced activity on a normal workday (historical), but a small set of users have increased activity, it might be that malware is triggering on a holiday or company outing. (Or, it might even be corporate espionage rather than programmatic malware). The ability to compare both to historical profiles as well as current (real-time) profiles provides a significant improvement in detection. This technique can be further enhanced through access to calendars and out-of-office settings.

Multiple profiles can be recorded for an individual user. By examining the computer (laptop/desktop, home machine, office machine, iPad, phone, etc.), the location (GPS, IP address, network address), and network type (in office, VPN, home network, airplane/train), a profile can be created and used to determine the expected range of activity. A user at the office will likely perform many more file operations than someone on transportation. However, if for any reason a particular user usually acts in a different manner, the DMS profile for that user would reflect whatever is usual for them to avoid false triggers.

The computer, location, and user profile can be used for, in any combination, but are not limited to: Preventing false alerts: Restricting/limiting or slowing file access: Alerting; and/or Hinting/scoring in combination with other factors or algorithms.

Documents or folders may also be profiled or marked for special handling. It is already known in the arts to detect when files have not been modified/read in order to archive them (compress or migrate to slower disks). A new application of this technique can detect file access to files/folders/matters that have not been accessed recently for the purpose of malware detection and mitigation. The DMS would be designed to differentiate between system activity (indexing, search results, virus scans, migrations) and client/user access activity. File dormancy can be flagged both on a read/open basis (recently read but not modified), and a modified basis.

Furthermore, flags on groups of files can be set or cleared manually, when a change in client or employee occurs, or when permission is approved for a file with a similar profile, or due to time passing. For example, when exiting an employee, the employee's access rights are usually disabled. At the same time, the files could be marked dormant, such that access causing an alert or permission indicator. If a customer stops doing business with a firm, all of their files could be marked dormant. Thus, access to those files would indicate unexpected behavior. More commonly, many professional services such as legal, banking, and real estate will have transactions with a customer that a frenetic for a short period of time following by long quiet periods due to the matters being resolved. Having time bounds to automatically mark dormancy for future malware activity is relatively simple without requiring the user to manually mark a matter or customer.

There may also DMS applications where a folder, set of files, or matters are temporarily synchronized/linked/downloaded to local drive. When, by explicit user action, the user can unlink a folder or entire matter, the group could be marked as dormant as the user's lack of interest in keeping a local copy suggests they won't be accessing it again on that computer very soon.

Confirmation Examples

In examples where a machine may be compromised, upon ransomware detection, more than one method of permission confirmation may be required. This could include confirmation by one or more of the following, but not limited to: Text message: Email: Instant message or messaging application; and/or Activity alerted/confirmed through the application itself or through a different application, on the same device or on a device separate from the activity.

An example alert or confirmation may be directed to the user themselves, and/or copied to administrators, IT, original document creators, folder/matter owners, or managers. In some examples, two-factor or multi-factor authentication is a technique known in the arts for validating log-in by using multiple devices or message paths. That way, if one path is compromised by malware or password exposure, the other path both alerts the user to the nefarious log-in attempt as well as prevents access.

For the systems and methods here, the multi-factor technique is uniquely applied to file-system activity, for example but not limited to open/read, write, delete, and/or rename. This triggers either based on settings, when malware infection is detected, an unusual activity, time/geo fencing, or any other criteria set forth in this disclosure. The trigger may cause a simple alert for awareness or may require a response to proceed.

Unlike a local file storage, such as a laptop hard drive, document management systems are vast remote file storage systems for entire companies. Often, the local file is merely a link or temporary local copy, which is then synchronized back into the system after a file operation is completed. As such, alerting or confirmation of an operation is understandable, and even desirable in some examples to the user, given the consequence can affect more than one user.

Example Method for Detecting Malware in a DMS

FIG. 9 is a flow process of an example method for detecting malware in a document management system (DMS). The method as described herein can be performed by a malware detection system (e.g., 300) part of a DMS as described herein.

At 902, the method can include, for at least a first file stored at a first storage node of the DMS, generating a first file stub providing a representation of the first file. The first file stub can include a set of details specific to the first file. An example file stub can include 602A as described in FIG. 6, for example.

At 904, the method can include providing the first file stub to a first local computer configured to present at least the first file stub in a file manager executing on the first local computer. The file manager can provide a number of file stubs, and can allow for navigation and sorting of file stubs across stored files in the DMS. An example file manager can include file manager 600 in FIG. 6.

At 906, the method can also include obtaining, from the first local computer, a request to download the first file to a first application on the first local computer. The request can include data relating to a file opening process captured by the first local computer. For instance, a user via a local computing device can select a file stub in the file manager to request the full file be downloaded for review/editing on the local computing device.

In some instances, the first file stub comprises any of a file name, a file type, and a version history of the first file. In some instances, the data relating to the file opening process includes a selection of the first file stub on the file manager executing on the first local computer.

At 908, the method can also include processing the data relating to the file opening process to predict whether the file opening process is a user-initiated process or a programmatic-initiated process. In some instances, a combination of factors can be weighed to generate a score indicative of whether the process is user-initiated or programmatic-initiated.

In some instances, the programmatic-initiated process comprises a software-initiated process to download a file that comprises malware. In some instances, the data relating to the file opening process includes a certificate for the first application, and the predicting of whether the file opening process is the user-initiated process or the programmatic-initiated process includes determining whether the certificate is signed by an entity included in a listing of approved entities for a file type specific to the first file.

In some instances, the predicting whether the file opening process is the user-initiated process or the programmatic-initiated process includes: determining whether the first application is included in a blacklist of restricted applications, wherein the file opening process is predicted as the programmatic-initiated process responsive to determining that the first application is included in the blacklist; and determining whether the first application is included in a whitelist of allowed applications, wherein the file opening process is predicted as the user-initiated process responsive to determining that the first application is included in the whitelist.

At 910, the method can also include, responsive to predicting that the file opening process comprises the user-initiated process, transmitting the first file to the first local computer to be presented on the first local computer via the first application.

At 912, the method can also include, responsive to determining that the file opening process comprises the programmatic-initiated process, performing an action to either request additional information prior to transmitting the first file to the first local computer or prevent transmission of the first file to the first local computer.

In some instances, the method can also include obtaining, by the first local computer, an instruction to close the first file, receiving, from the first local computer, the first file, storing the first file and any revisions made to the first file at the first storage node of the DMS, and recreating the first file stub for presentation at the file manager implemented at the first local computer.

In some instances, the action to request additional information prior to transmitting the first file to the first local computer includes: transmitting, via a second communication channel for a user account specific to the first local computer, a multi-factor authentication message, wherein the first file is transmitted to the first local computer responsive to a successful response to the multi-factor authentication message.

In some instances, the predicting whether the file opening process is the user-initiated process or the programmatic-initiated process includes: determining a first deviance between a time of obtaining the request to download the first file and historical timestamps for requesting download of files, and determining a second deviance between a location of the first local computer at the time of obtaining the request to download the first file and historical locations of the first local computer when requesting download of files, wherein a greater first deviance and/or second deviance increases a predicted likelihood that the file opening process is the programmatic-initiated process.

In some instances, the action to prevent transmission of the first file to the first local computer includes restricting access of a user account associated with the first local computer from making requests to download files and/or limiting a number of requests the user account can provide to download files.

In another example embodiment, a document management system (DMS) is provided. The DMS can include a processor and one or more memory nodes. The one or more memory nodes can include instructions that, when executed by the processor, cause the processor to generate a first file stub providing a representation of a first file.

The instructions can further cause the processor to provide the first file stub to a first local computer configured to present at least the first file stub in a file manager executing on the first local computer.

The instructions can further cause the processor to obtain, from the first local computer, a request to download the first file to a first application on the first local computer. The request can include data relating to a file opening process captured by the first local computer.

The instructions can further cause the processor to process the data relating to the file opening process to predict whether the file opening process is a user-initiated process or a programmatic-initiated process. The predicting of whether the file opening process is the user-initiated process or the programmatic-initiated process is based on a combination of whether the first file stub was selected from the file manager, whether the first application is included in a whitelist and/or a blacklist, and/or whether the first application comprises a signed certificate.

In some instances, predicting whether the file opening process is the user-initiated process or the programmatic-initiated process comprises generating a score for the file opening process, wherein the score is increase responsive to determining that first file stub was selected from the file manager, thereby increasing a predicted likelihood the file opening process is the user-initiated process.

In some instances, the score is decreased responsive to the first application being included on the blacklist, and the score is increased responsive to the first application being included on the whitelist and/or when the first application comprises the signed certificate.

In some instances, the predicting whether the file opening process is the user-initiated process or the programmatic-initiated process includes: determining a first deviance between a time of obtaining the request to download the first file and historical timestamps for requesting download of files, and determining a second deviance between a location of the first local computer at the time of obtaining the request to download the first file and historical locations of the first local computer when requesting download of files, wherein the score is lowered as the first deviance and/or second deviance increases, specifying an increased predicted likelihood that the file opening process comprises the programmatic-initiated process.

The instructions can further cause the processor to, responsive to predicting that the file opening process comprises the user-initiated process, transmit the first file to the first local computer to be presented on the first local computer via the first application.

The instructions can further cause the processor to, responsive to determining that the file opening process comprises the programmatic-initiated process, perform an action to either request additional information prior to transmitting the first file to the first local computer or prevent transmission of the first file to the first local computer.

In some instances, the instructions further cause the processor to obtain, by the first local computer, an instruction to close the first file, receive, from the first local computer, the first file, store the first file and any revisions made to the first file, and recreate the first file stub for presentation at the file manager implemented at the first local computer.

In some instances, the action to request additional information prior to transmitting the first file to the first local computer includes transmitting, via a second communication channel for a user account specific to the first local computer, a multi-factor authentication message, wherein the first file is transmitted to the first local computer responsive to a successful response to the multi-factor authentication message.

In another example embodiment, a computer-implemented method is provided. The computer-implemented method can include obtaining, by a malware detection system part of a document management system (DMS) from a first local computer, a request to download a first file to a first application on the first local computer based on a selection of a first file stub for the first file. The first file can be remotely stored at a first storage node of the DMS, and the request can include data relating to a file opening process captured by the first local computer.

The computer-implemented method can also include processing the data relating to the file opening process to predict whether the file opening process is a user-initiated process or a programmatic-initiated process.

The computer-implemented method can also include, responsive to predicting that the file opening process comprises the user-initiated process, transmitting the first file to the first local computer to be presented on the first local computer via the first application.

The computer-implemented method can also include, responsive to determining that the file opening process comprises the programmatic-initiated process, performing an action to either request additional information prior to transmitting the first file to the first local computer or prevent transmission of the first file to the first local computer.

In some instances, the data relating to the file opening process includes a certificate for the first application, and wherein the predicting whether the file opening process is the user-initiated process or the programmatic-initiated process includes determining whether the certificate is signed by an entity included in a listing of approved entities for a file type specific to the first file.

In some instances, the predicting whether the file opening process is the user-initiated process or the programmatic-initiated process includes: determining whether the first application is included in a blacklist of restricted applications, wherein the file opening process is predicted as the programmatic-initiated process responsive to determining that the first application is included in the blacklist, and determining whether the first application is included in a whitelist of allowed applications, wherein the file opening process is predicted as the user-initiated process responsive to determining that the first application is included in the whitelist.

In some instances, the action to request additional information prior to transmitting the first file to the first local computer includes: transmitting, via a second communication channel for a user account specific to the first local computer, a multi-factor authentication message, wherein the first file is transmitted to the first local computer responsive to a successful response to the multi-factor authentication message.

Networked System Examples

Figure 10:
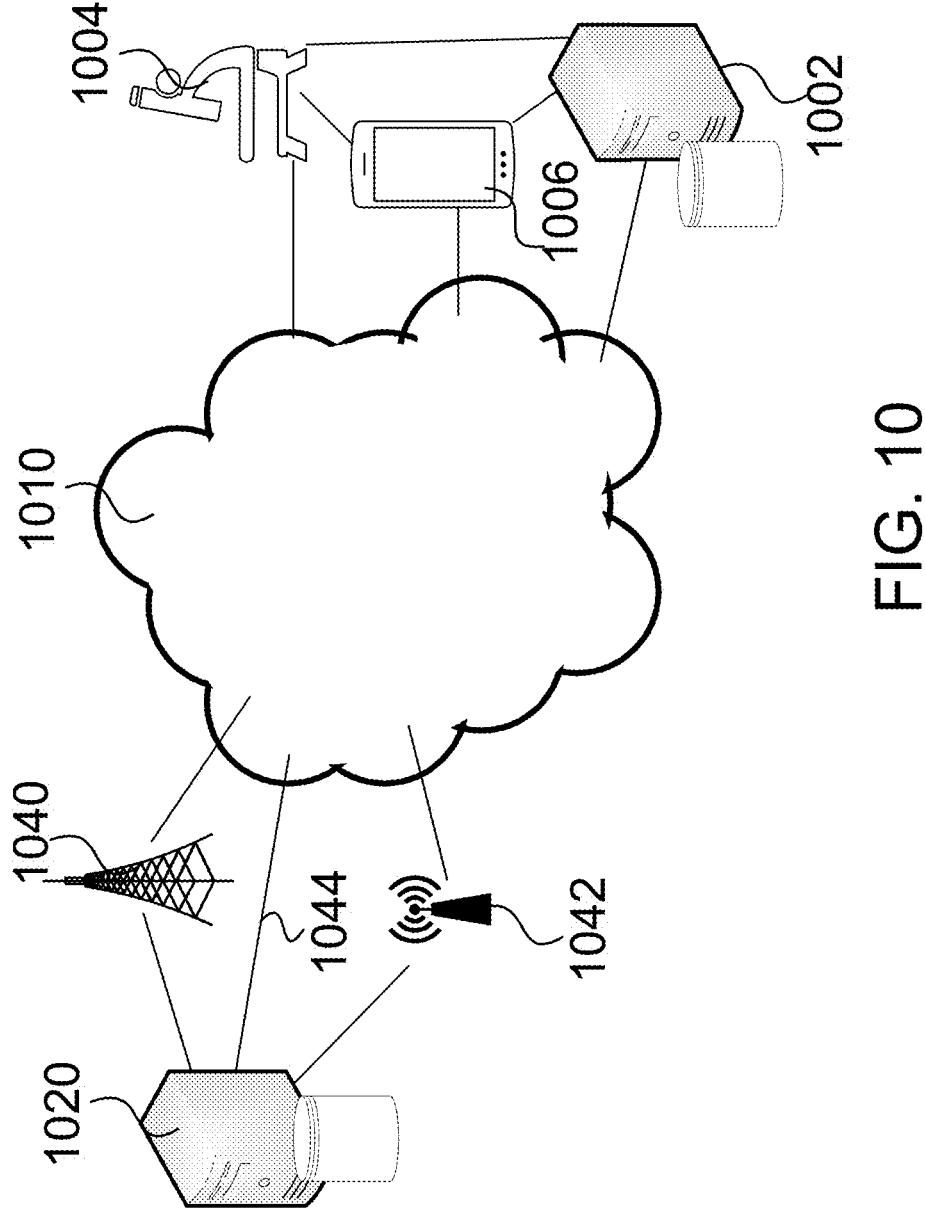
FIG. 10 is an illustration of an example networked system in accordance with certain aspects described herein.

In some examples, as shown in FIG. 10, a computer 1002 with processor and memory is configured to run software. The computer 1002 may be in communication with a network 1010 such as the Internet or local area network. Such computers may include any kind of computer such as but not limited to tablets, smartphones, desktops, laptops, or other computers 1006, and multiple computers may be in communication with one another or run the software as described herein. More detailed and/or further examples of such computers are found in FIG. 11.

Turning back to FIG. 10, the data captured from whichever computer 1002, 1006 may be analyzed on a back end system 1020 instead of or in addition to a local computer. In such examples, data may be transmitted to a back end computer 1020 and associated data storage for saving, analysis, computation, comparison, or other manipulation. In some examples, additionally or alternatively, the transmission of data may be wireless by a cellular 1040 or Wi-Fi 1042 transmission with associated routers and hubs. In some examples, additionally or alternatively, the transmission may be through a wired connection 1044. In some examples, additionally or alternatively, the transmission may be through a network such as the internet 1010 to the back end server computer 1020 and associated data storage. At the back end server computer 1020 and/or local computer systems 1002, 1004 and their respective associated data storage, the spectrometer data, sample identification, sample location, time, date, and/or any other associated test data may be stored, analyzed, compared to previously stored spectrometer data, identification, and/or any other kind of data analysis. In some examples, additionally or alternatively, the data storing, analyzing, and/or processing may be shared between the local computer 1002, 1004 and a back end computing system 1020. In such examples, networked computer resources may allow for more data processing power to be utilized than may be otherwise available at the local computers. In such a way, the processing and/or storage of data may be offloaded to the compute resources that are available. In some examples, additionally or alternatively, the networked computer resources 1020 may be virtual machines in a cloud or distributed infrastructure. In some examples, additionally or alternatively, the networked computer resources 1020 may be spread across many multiple physical or virtual computer resources by a cloud infrastructure. The example of a single computer server 1020 is not intended to be limiting and is only one example of a compute resource that may be utilized by the systems and methods described herein. In some examples, additionally or alternatively, artificial intelligence and/or machine learning may be used to analyze the spectrometer data from the samples. Such systems may employ data sets to train algorithms to help produce better and better results of analysis of samples.

Because the computer systems 1002, 1006 are in communication with the systems 1004, the software running on the computer(s) 1006, 1002 may be used for any number of things including but not limited to, power on the system, open and close the shutter on the is device 1004, continuous spectra collection, calibration for both light and dark, collect spectra, stop collection and save.

Example Computer Devices

Figure 11:
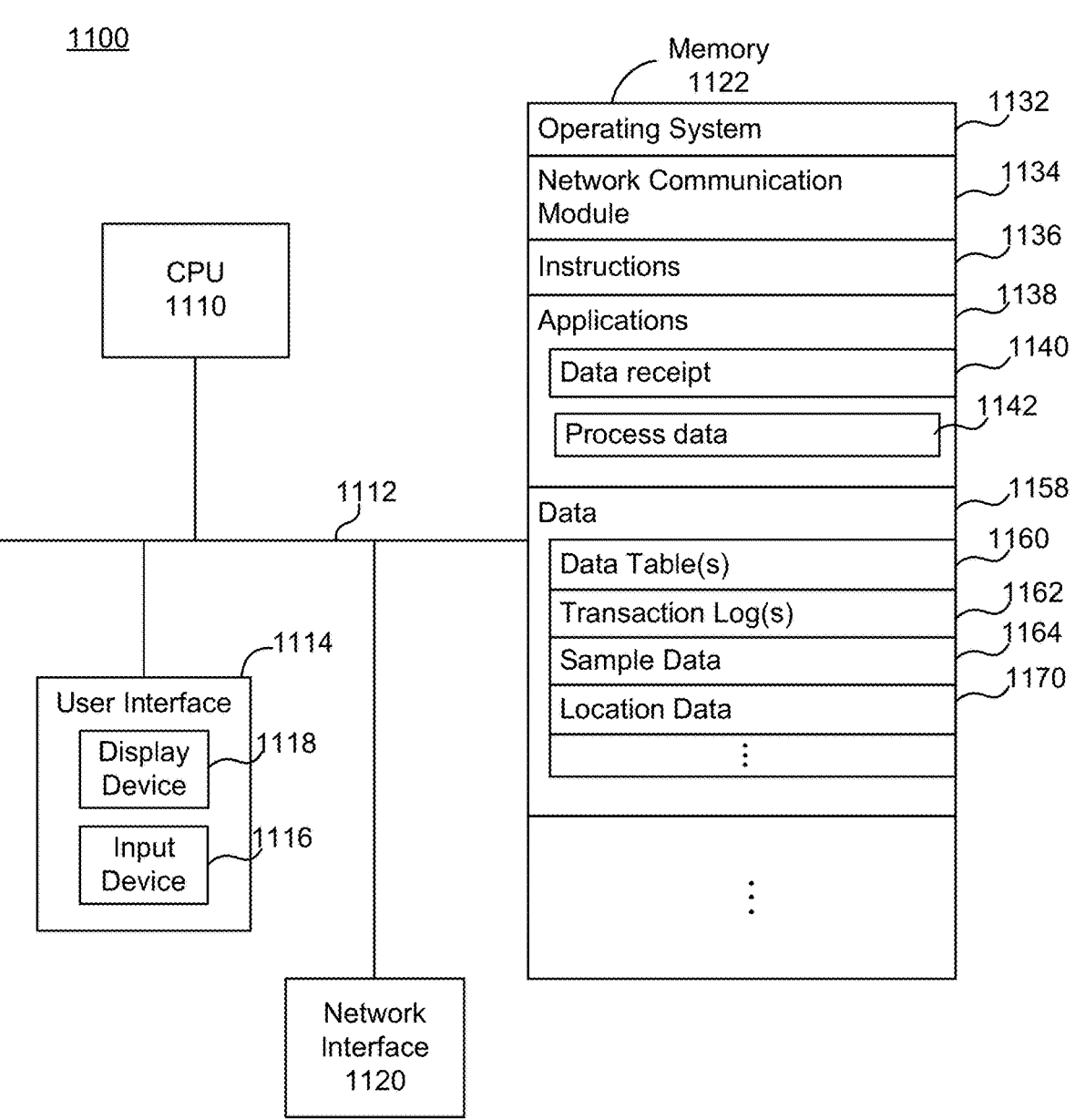
FIG. 11 is an illustration of an example computer system in accordance with certain aspects described herein.

FIG. 11 shows an example computing device 1100 which may be used in the systems and methods described herein. In the example computer 1100 a CPU or processor 1110 is in communication by a bus or other communication 1112 with a user interface 1114. The user interface includes an example input device such as a keyboard, mouse, touchscreen, button, joystick, or other user input device(s). The user interface 1114 also includes a display device 1118 such as a screen. The computing device 1100 shown in FIG. 11 also includes a network interface 1120 which is in communication with the CPU 1120 and other components. The network interface 1120 may allow the computing device 1100 to communicate with other computers, databases, networks, user devices, or any other computing capable devices. In some examples, additionally or alternatively, the method of communication may be through WIFI, cellular. Bluetooth Low Energy, wired communication, or any other kind of communication. In some examples, additionally or alternatively, the example computing device 1100 includes peripherals 1124 also in communication with the processor 1110. In some examples, additionally or alternatively, peripherals include stage motors 1126 such as electric servo and/or stepper motors used for moving the probe up and down. In some examples, computing devices 1100, a memory 1122 is in communication with the processor 1110. In some examples, additionally or alternatively, this memory 1122 may include instructions to execute software such as an operating system 1132, network communications module 1134, other instructions 1136, applications 1138, applications to control the spectrometer and/or light source 1140, applications to process data 1142, data storage 1158, data such as data tables 1160, transaction logs 1162, sample data 1164, sample location data 1170 or any other kind of data.

CONCLUSION

As disclosed herein, features consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the embodiments or they may include a computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., H3P, FTP, SMTP, and so on).

Unless the context clearly requires otherwise, throughout the description and the claims, the words "comprise," "comprising," and the like are to be construed in an inclusive sense as opposed to an exclusive or exhaustive sense: that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the description pertains, that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a processor, the program code segments combine with the processor to provide a unique device that operates analogously to specific logic circuits.

The software is stored in a machine-readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables: copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method performed by a malware detection system executing on at least one computing device of a series of interconnected devices implementing a document management system (DMS), the method including:

for at least a first file stored at a first storage node of the DMS, generating a first file stub providing a graphical representation of the first file, the first file stub including a set of details specific to the first file that includes a file type and a name of the file presented in the graphical representation of the first file;

providing the first file stub to a first local computer configured to present at least the first file stub in a file manager executing on the first local computer;

obtaining, from the first local computer, a request to download the first file to a first application on the first local computer, the request including data relating to a file opening process captured by the first local computer;

processing the data relating to the file opening process to predict whether the file opening process is a user-initiated process or a programmatic-initiated process that includes at least determining whether the first file stub was selected in the file manager executing on the first local computer;

responsive to predicting that the file opening process comprises the user-initiated process, transmitting the first file to the first local computer to be presented on the first local computer via the first application; and responsive to determining that the file opening process comprises the programmatic-initiated process, performing an action to either request additional information prior to transmitting the first file to the first local computer or prevent transmission of the first file to the first local computer.

2. The method of claim 1, wherein the first file stub comprises any of a file name, a file type, and a version history of the first file.

3. The method of claim 1, wherein the data relating to the file opening process includes a selection of the first file stub on the file manager executing on the first local computer.

4. The method of claim 1, wherein the data relating to the file opening process includes a certificate for the first application, and wherein the predicting whether the file opening process is the user-initiated process or the programmatic-initiated process includes determining whether the certificate is signed by an entity included in a listing of approved entities for a file type specific to the first file.

5. The method of claim 1, wherein the predicting whether the file opening process is the user-initiated process or the programmatic-initiated process includes:

determining whether the first application is included in a blacklist of restricted applications, wherein the file opening process is predicted as the programmatic-initiated process responsive to determining that the first application is included in the blacklist; and determining whether the first application is included in a whitelist of allowed applications, wherein the file opening process is predicted as the user-initiated process responsive to determining that the first application is included in the whitelist.

6. The method of claim 1, further comprising:

obtaining, by the first local computer, an instruction to close the first file;

receiving, from the first local computer, the first file;

storing the first file and any revisions made to the first file at the first storage node of the DMS; and recreating the first file stub for presentation at the file manager implemented at the first local computer.

7. The method of claim 1, wherein the action to request additional information prior to transmitting the first file to the first local computer includes:

transmitting, via a second communication channel for a user account specific to the first local computer, a multi-factor authentication message, wherein the first file is transmitted to the first local computer responsive to a successful response to the multi-factor authentication message.

8. The method of claim 1, wherein the predicting whether the file opening process is the user-initiated process or the programmatic-initiated process includes:

determining a first deviance between a time of obtaining the request to download the first file and historical timestamps for requesting download of files; and determining a second deviance between a location of the first local computer at the time of obtaining the request to download the first file and historical locations of the first local computer when requesting download of files, wherein a greater first deviance and/or second deviance increases a predicted likelihood that the file opening process is the programmatic-initiated process.

9. The method of claim 1, wherein the action to prevent transmission of the first file to the first local computer includes restricting access of a user account associated with the first local computer from making requests to download files and/or limiting a number of requests the user account can provide to download files.

10. The method of claim 1, wherein the programmatic-initiated process comprises a software-initiated process to download a file that comprises malware.

11. A document management system (DMS) comprising:
a processor; and
one or more memory nodes comprising instructions that, when executed by the processor, cause the processor to:
generate a first file stub providing a representation of a first file;
provide the first file stub to a first local computer configured to present at least the first file stub in a file manager executing on the first local computer, the first file stub including a set of details specific to the first file that includes a file type and a name of the file presented in the graphical representation of the first file;
obtain, from the first local computer, a request to download the first file to a first application on the first local computer, the request including data relating to a file opening process captured by the first local computer;
process the data relating to the file opening process to predict whether the file opening process is a user-initiated process or a programmatic-initiated process, the predicting of whether the file opening process is the user-initiated process or the programmatic-initiated process is based on a combination of whether the first file stub was selected from the file manager executing on the first local computer, whether the first application is included in a whitelist and/or a blacklist, and/or whether the first application comprises a signed certificate;
responsive to predicting that the file opening process comprises the user-initiated process, transmit the first file to the first local computer to be presented on the first local computer via the first application; and
responsive to determining that the file opening process comprises the programmatic-initiated process, perform an action to either request additional information prior to transmitting the first file to the first local computer or prevent transmission of the first file to the first local computer.

12. The DMS of claim 11, wherein predicting whether the file opening process is the user-initiated process or the programmatic-initiated process comprises generating a score for the file opening process, wherein the score is increase responsive to determining that the first file stub was selected from the file manager, thereby increasing a predicted likelihood the file opening process is the user-initiated process.

13. The DMS of claim 12, wherein the score is decreased responsive to the first application being included on the blacklist, and the score is increased responsive to the first application being included on the whitelist and/or when the first application comprises the signed certificate.

14. The DMS of claim 12, wherein the predicting whether the file opening process is the user-initiated process or the programmatic-initiated process includes:
determining a first deviance between a time of obtaining the request to download the first file and historical timestamps for requesting download of files; and
determining a second deviance between a location of the first local computer at the time of obtaining the request to download the first file and historical locations of the first local computer when requesting download of files, wherein the score is lowered as the first deviance and/or second deviance increases, specifying an increased predicted likelihood that the file opening process comprises the programmatic-initiated process.

15. The DMS of claim 11, wherein the instructions further cause the processor to:
obtain, by the first local computer, an instruction to close the first file;
receive, from the first local computer, the first file;
store the first file and any revisions made to the first file; and
recreate the first file stub for presentation at the file manager implemented at the first local computer.

16. The DMS of claim 11, wherein the action to request additional information prior to transmitting the first file to the first local computer includes transmitting, via a second communication channel for a user account specific to the first local computer, a multi-factor authentication message, wherein the first file is transmitted to the first local computer responsive to a successful response to the multi-factor authentication message.

17. A computer-implemented method comprising:
obtaining, by a malware detection system part of a document management system (DMS) from a first local computer, a request to download a first file to a first application on the first local computer based on a selection of a first file stub for the first file, the first file remotely stored at a first storage node of the DMS, the request including data relating to a file opening process captured by the first local computer, the first file stub including a set of details specific to the first file that includes a file type and a name of the file presented in the graphical representation of the first file;
processing the data relating to the file opening process to predict whether the file opening process is a user-initiated process or a programmatic-initiated process that includes at least determining whether the first file stub was selected in the file manager executing on the first local computer;
responsive to predicting that the file opening process comprises the user-initiated process, transmitting the first file to the first local computer to be presented on the first local computer via the first application; and
responsive to determining that the file opening process comprises the programmatic-initiated process, performing an action to either request additional information prior to transmitting the first file to the first local computer or prevent transmission of the first file to the first local computer.

18. The computer-implemented method of claim 17, wherein the data relating to the file opening process includes a certificate for the first application, and wherein the predicting whether the file opening process is the user-initiated process or the programmatic-initiated process includes determining whether the certificate is signed by an entity included in a listing of approved entities for a file type specific to the first file.

19. The computer-implemented method of claim 17, wherein the predicting whether the file opening process is the user-initiated process or the programmatic-initiated process includes:
determining whether the first application is included in a blacklist of restricted applications, wherein the file opening process is predicted as the programmatic-initiated process responsive to determining that the first application is included in the blacklist; and
determining whether the first application is included in a whitelist of allowed applications, wherein the file opening process is predicted as the user-initiated process responsive to determining that the first application is included in the whitelist.

20. The computer-implemented method of claim 17, wherein the action to request additional information prior to transmitting the first file to the first local computer includes:

transmitting, via a second communication channel for a user account specific to the first local computer, a multi-factor authentication message, wherein the first file is transmitted to the first local computer responsive to a successful response to the multi-factor authentication message.

* * * * *